(12) United States Patent
Zafiratos

(10) Patent No.: US 6,262,426 B1
(45) Date of Patent: Jul. 17, 2001

(54) TECHNIQUE AND PROCESS FOR THE IMAGING AND FORMATION OF VARIOUS DEVICES AND SURFACES

(75) Inventor: Spyridon Zafiratos, Philadelphia, PA (US)

(73) Assignee: S&F Technological Development and Solutions Partners, Williamstown, NJ (US)

( * ) Notice: Subject to any disclaimer, the term of this patent is extended or adjusted under 35 U.S.C. 154(b) by 0 days.

(21) Appl. No.: 09/427,441

(22) Filed: Oct. 27, 1999

(51) Int. Cl.$^7$ .............................. G11B 21/04; H01J 37/30

(52) U.S. Cl. ...................... 250/492.2; 250/306; 205/136; 205/123; 65/386; 65/425

(58) Field of Search ................................ 250/492.2, 306; 205/136, 123, 118; 65/425, 386

(56) References Cited

U.S. PATENT DOCUMENTS

| | | | |
|---|---|---|---|
| 4,896,044 | 1/1990 | Li et al. | 250/492.3 |
| 4,968,390 | * 11/1990 | Bard et al. | 205/115 |
| 5,007,698 | 4/1991 | Sasaki et al. | 350/96.15 |
| 5,021,672 | * 6/1991 | Parkinson | 250/492.2 |
| 5,047,649 | 9/1991 | Hodgson et al. | 250/492.2 |
| 5,150,242 | 9/1992 | Fellows | 359/108 |
| 5,159,473 | 10/1992 | Feldman | 359/1 |
| 5,360,764 | 11/1994 | Celotta et al. | 437/173 |
| 5,478,698 | 12/1995 | Rostoker et al. | 430/296 |
| 5,502,781 | 3/1996 | Li et al. | 385/4 |
| 5,504,338 | * 4/1996 | Marrian et al. | 250/492.2 |
| 5,510,614 | 4/1996 | Mitsuya et al. | 250/306 |
| 5,660,706 | 8/1997 | Zhao et al. | 205/123 |
| 5,705,047 | 1/1998 | Lee | 205/123 |

OTHER PUBLICATIONS

The Electrochemical Society, Inc., "A Contactless Method for the Directed Formation of Submicrometer Copper Wires", http://www.electrochem.org/journal/mar 98/letters/lett 980307, html.
The American Physical Society, "Nanoscale Electrochemistry," Jun. 22, 1998, pp. 5599–5602.
Letters to Nature, "Creating Electrical Contacts Between Metal Particles Using Directed Electrochemical Growth," vol. 389, Sep. 18, 1997, pp. 268–271.
Advanced Materials 1997, 9, "Wire Formation on Circuit Boards Using Spatially Coupled Bipolar Electrochemistry," pp. 1–5.

* cited by examiner

Primary Examiner—Jack Berman
(74) Attorney, Agent, or Firm—Norman E. Lehrer

(57) ABSTRACT

A technique is described for the formation of nano and micro-scale patterns and optical wave-guides, by using Bipolar Electrochemistry. Atoms are deposited or removed from a surface by creating and moving ions into or out of a medium by the use of electric fields, currents, and induced surface charges. To improve the deposition process, lasers, electron, and ion lenses can be positioned over the surface being deposited to further define the pattern being created. This technique does not harm the surface or crystal lattice of the substrate being deposited on and is powerful enough to transport dopants completely through a substrate. The technique can be used to expose electron beam activated resist which can be used in traditional fabrication processes or to create wave-guides connecting separate optical or electro-optical devices together. As a result smaller and newer types of integrated circuits, electronic devices, and micro machines can be fabricated. The technique can also be used to improve current fabrication processes, the repair of faulty devices, and the imaging of surfaces and hidden dopants.

26 Claims, 21 Drawing Sheets

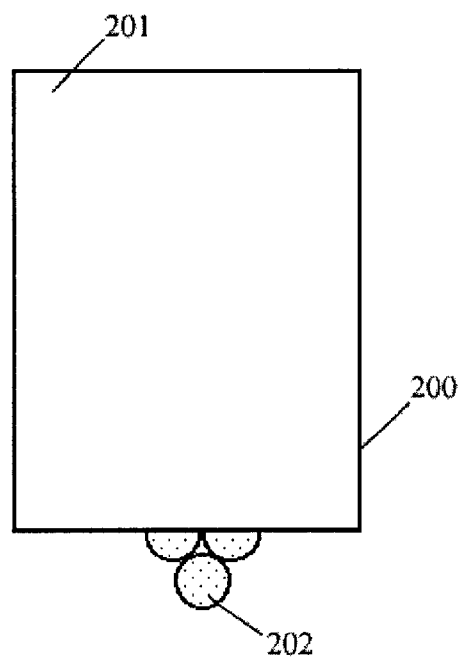
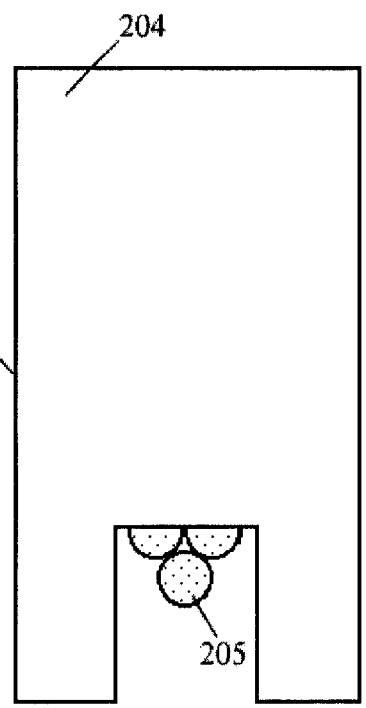
FIG. 2A  FIG. 2B
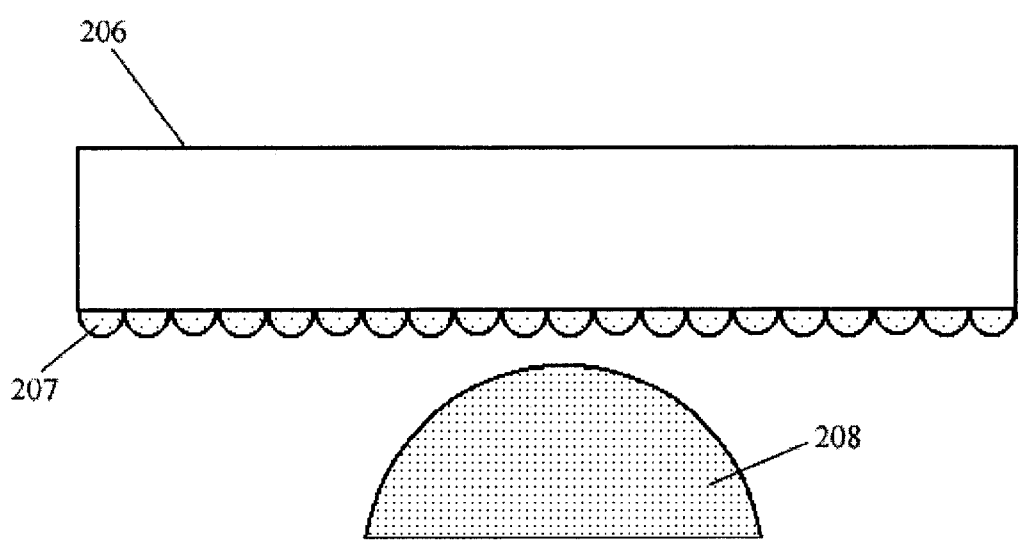
FIG. 2C

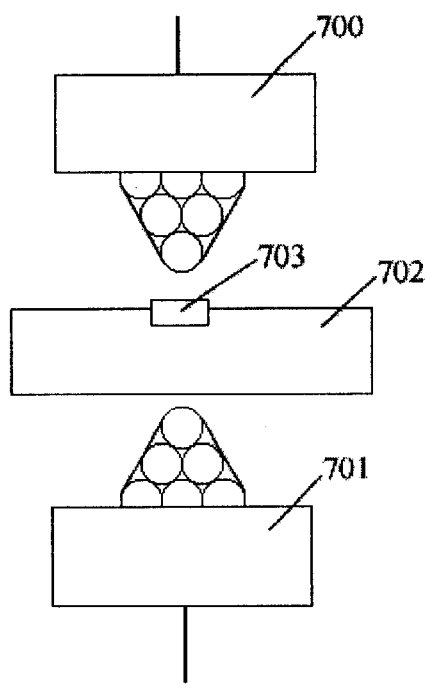
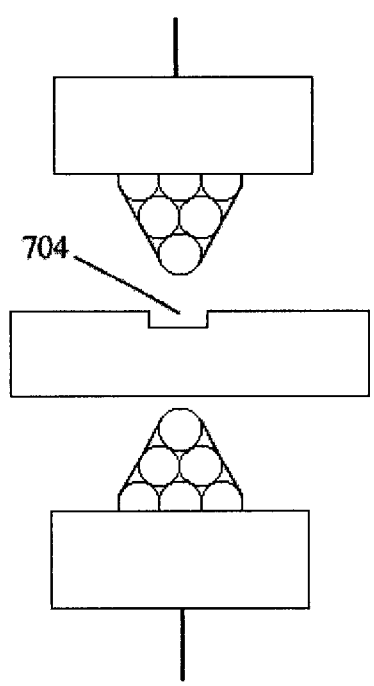
FIG. 7A  FIG. 7B
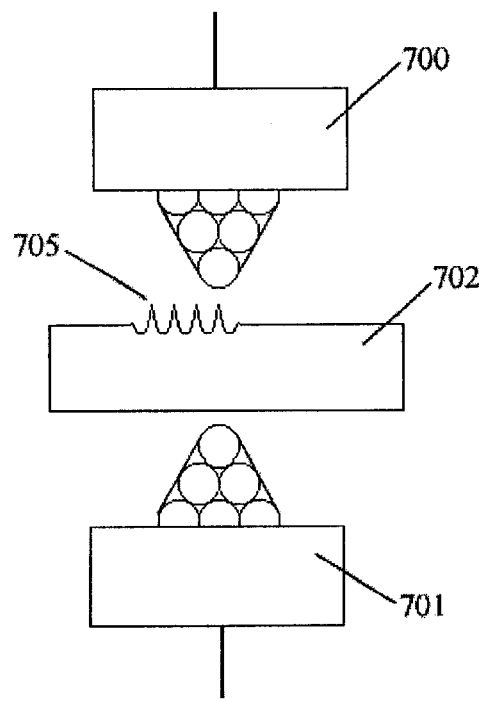
FIG. 7C

TECHNIQUE AND PROCESS FOR THE IMAGING AND FORMATION OF VARIOUS DEVICES AND SURFACES

TECHNICAL FIELD OF INVENTION

This invention is directed toward a technique for improving the imaging and fabrication of new and traditional types of integrated electrical devices, electro-optical devices, optical devices, and micro machines.

BACKGROUND OF INVENTION

Unbound atoms naturally attract or expel electrons forming ions. In general, metal atoms lose electrons most readily becoming positive ions, while nonmetals prefer to gain electrons becoming negative ions. Atoms joined together as molecules can also possess net positive or negative charges. These atoms are called dipoles. Atoms because they contain a positive nucleus and a negative electron cloud can become polarized in an electric field; the atoms in this state are also usually referred to as dipoles. In an electric field the atom can be thought of as possessing two superimposed positive and negative charged regions. Upon the application of the electric field the positive charge nucleus moves in the direction of the applied field and the negative charged electrons move in the opposite direction. If the electric field is strong enough, an electron may be stripped from the atom creating a positive ion, in which case the atom will migrate toward a negative charged electrode. Each element has a different ionization enthalpy, which is the energy required to remove an electron from one mole of gaseous atoms or ions.

Material sandwiched between a positive and negative charged plate can also become polarized. In this application the material between the plate is called a dielectric. Induced positive and negative surface charge densities form within the dielectric nearest to the plates, a positive region near the negative plate and a negative region near the positive plate. The distance between the plates is limited by the electric discharge that could occur through the dielectric medium. The maximum voltage that can be applied between the plates is dependent on the strength of the electric field or the dielectric strength of the dielectric. The dielectric by nature reduces the electric field potential between the charged plates or probes. If the field strength in the medium exceeds the dielectric strength the insulating properties break down and the medium begins to conduct. Every substance has its own unique dielectric strength. An electric field created between two oppositely charged very sharp tip probes, unlike the charged plates, is not uniform, but weakens along a radius perpendicular to a imaginary line connecting the centers of the probes tips. The maximum electric field potential lies at the tips of the probes. Therefore, the maximum surface charges created by the electric field are found on the dielectric underneath the probe tips.

The process of moving elements through a liquid medium from one charged inert electrode to a second oppositely charge inert electrode is called electrolysis. If the electrodes participate in the electrolysis process one electrode may dissolve and plate the other. This deposition of one electrode onto another is commonly called electroplating. The movement of ions in a solution can be used as a technique as shown by Dr. Jean-Claude Bradley in his published articles appearing in Nature (1997, vol. 389, p.268) and Advanced Materials in December 1997 (vol. 15, p. 1168) to create micro wires and micro wire connections between circuits. In his procedure two thin copper plates are placed between two inert highly charged electrodes. The electrodes induce opposite surface charges on the copper plates. The surface charges create copper ions that travel across a substrate from one plate to the other. Because of gravity and Brownian motion of the medium the ions slow down and deposit on a surface between the copper plates. The ions deposited between the plates form a non-conducting wire type pattern. To make the wire conductive the pattern is placed in a copper plating solution for a set time.

Dr. Bradley's technique is called Spatially Coupled Bipolar Electrochemistry (SCBE), because the method avoids physical contact with the devices three-dimensional circuitry can be created. His technique is also used to form functional catalysts in which the positioning of catalytic materials can be precisely placed on isolated particles a few microns wide allowing for the creation of designer catalyst that can be used in commercial and industrial applications.

Another technique to manipulate neutral atoms is by creating standing electromagnetic waves positioned on top of a substrate in a vacuum to focus neutral atoms into linear or dot patterns by dipole force interactions, as shown in U.S. Pat. No. 5,360,764, issued to Celotta, et al. This process which also works for ions is designed to create evenly spaced groups of linear or spotted patterns for semiconductor devices. To create single lines or dots, a filter or mask is used to block the unwanted material. The process works since atoms of different elements will only absorb photons with a specific energy. Because of this a group of tunable lasers can be set to a frequency just below the atoms abortion frequency so that the atoms will not absorb the photons. Instead the photons will interact with the atom and change the atom's momentum slowing it down. This procedure is called laser cooling. The use of multiple lasers can actually trap atoms in a suspended state. The 1997 Nobel Prize in physics was awarded jointly to Steven Chu, Claude Cohen-Tannoundji and William D. Phillips for the development of methods to trap and cool atoms.

In current fabrication of integrated circuits at any scale, an opaque mask or reticle with a desired pattern is created to block light usually infrared, or an electron beam from exposing a photon or an electron beam sensitive resist placed on top of a substrate. In the fabrication of integrated circuits the substrate is a semiconductor. In the creation of micro machines the substrate can be any dissolvable material from which the part can later be freed. After exposure the exposed area of the resist is then removed, if a positive resist is used, a void will be created. In the creation of semiconductor devices the void is filled with a selected doping material. The dopants most readily used are phosphorous pentoxide or boron nitride. After the dopant has been placed on the silicon it is placed in a furnace with temperatures between 950 and 1000 degrees Celsius. The dopant, because of the high temperature, will diffuse into the substrate. The dopant concentrations, depth, and distribution in the substrate are mostly unpredictable.

Silicon dioxide can also be formed on the substrate acting as insulation between a silicon substrate and the interconnecting wires. The silicon dioxide is formed at 1100 degree Celsius temperatures. During the formation of silicon dioxide the surface silicon is being consumed. The final stage is connecting the wires and annealing them at 475 degrees Celsius. These steps are usually repeated a few times to create integrated circuits or a micro machine. The size of the device is dependent on the wavelength of the resist exposing particles, the smaller the wavelength the greater the resolution.

In a semiconductor wafer the electrically active area is only 10 microns deep which is usually only 1% the thickness of a typical wafer used in commercial applications. If energetic short wave particles like x-rays or elections are used to expose the resist to achieve greater resolution, they can destroy the surface of the substrate. Furthermore, if the substrate is a semiconductor unknown defects in crystalline structure can form allowing for unwanted and unpredictable variations in the devices electrical properties through the thin shell in which the current flows. This can hamper the goal for current fabrication, which is to create micro devices as small and defined as possible. The more devices that can be fitted onto a single surface will reduce the cost, the delay in switching, and the power consumption of the device (up to a physical point).

In 1986 Gerd Benning and Heinrich Rohrer who shared the Nobel Prize in 1986 with Ruska created the scanning tunneling microscope, STM. STM works by placing a tungsten probe with a tip with a width of an atom held between 0.1 and 1 mm over a conducting surface. An electron tunneling current flows through a vacuum between the tip and the conducting surface of the substrate when a potential difference is applied. As the probe moves across the substrate and the tunneling current changes as the distance between the probe and surface changes, an image of the surface can be created with the required devices. In this imaging technique horizontal resolution is about 0.1 nm and vertical resolution is about 0.001 nm.

If the potential is increased between the probe and substrate, surface atoms can be vaporized from the surface. This is shown in U.S. Pat. No. 4,896,044 issued to Li, et al. The current can only last about 200 microseconds, if a longer duration is used the material and substrate may melt locally. This technique can only be used for conducting surface materials and like electron beam lithography could harm the substrates underlying atomic structure.

In another technique using an "Electrochemical STM". A sharp probe and conductive surface are submerged in a highly concentrated electrolyte consisting of copper sulfate and sulfuric acid, as shown in Dr. Rolf Schuster's published article appearing in, Physical Review Letters, 80,5599 (1998). A 60-nanosecond pulse of voltage is further applied between the needle and substrate, creating a pit in the surface of the substrate 5 nm in diameter and with a 0.3 to 1 nm depth. By reversing the voltage copper ions in the electrolyte can be deposited on the substrate, creating 1 nm high by 8 nm diameter formations. In this set up ultra-short pulses must be used, if not micrometer size modifications are created. This is due to the spreading of the electric fields from the probe's tip along the charged substrate's surface to its ends. With a short pulse, the electric field created interacts with the area underneath the probe's tip quickly enough so that the areas surface charge is not weakened locally. Because of this the electric field does not have the time to widen creating a larger formation or pit.

Another technique is shown in U.S. Pat. No. 5,478,698 issued to Rostoker, et al., in which the electrons emanating between the probe and surface exposes an electron beam resist. Nano-patterns can also be formed on an insulating material, as shown in U.S. Pat. No. 5,042,649 issued to Hodgson, et al. Currently various forms of STM's are being used to create nano-sized patterns on electron beam sensitive resists to be used in traditional lithography processes.

There are some problems in current integrated circuit fabrication that are not a major issues currently, but are going to become more relevant as devices get smaller. The first problem is to make smaller devices. In the traditional lithography process the transparent resist used in the traditional mask can not be exposed using extreme ultraviolet light, which is light with a wavelength below 150 nm. Currently lithography manufacturers are starting to use 193 nm ArF lasers. As illustrated above, using the STM may solve this problem, but unlike lithography techniques, STM's can only create the patterns on a chip one at a time, making STM resist exposing very slow and expensive.

The second problem is that as the interconnect wires between transistors get smaller the resistance and capacitance of the circuit increases which creates delays in data transfer.

Finally, another major problem is the heat generated from the formed chips, as they get smaller their power consumption increases as well as the operating electrical currents which can be as high as 50-amps, therefore increasing the device's operating temperature. As the temperature of the device increases, errors and possible diffusion among the material patterned on the device increases. Currently, copper interconnects are begging to be used instead of traditional aluminum interconnects, since copper has a better resistance than aluminum. Copper, like aluminum, will eventually reach its limit. For this reason new and novel devices must be created.

Gallium arsenide (GaAs), and a few other semiconductor materials are traditionally used in the formation of light emitting diodes (LED's) and detectors in conjunction with optical fiber interconnects to transfer data between two devices and between individual computer chips, eliminating the need for traditional copper wire data transfer interconnects. The advantages of GaAs and fiber optic devices is that data transfer between two computer chips is less restrictive and faster, eliminating most of the problems associated with current and future integrated device designs. A fiber optic line (or wave-guide as sometimes called) is made from glass, crystalline, polymeric, or plastic materials. Each optical material has its own degree of transparency and refractive index. Plastic and polymeric fibers are the cheapest to manufacture but are traditionally the worst optically. Haze and birefringence are inherent to plastics. Plastics also have large variations in their refractive index with changes in temperature.

A fiber optic wire is usually made of one dielectric material called the core surrounded by a second dielectric material with a smaller refractive index called the cladding. Electromagnetic energy entering the fiber is then confined by the phenomenon of total reflection caused by the differences in the refractive index of the two dielectrics. In integrated optics the core is created by ion implantation or diffusion, creating a region with a higher index of refraction within the original material.

The problem associated with the formation of optical interconnects or any optical device is that the creation of optical interconnects is an expensive and fragile process. As an example, the above GaAs interconnect is formed by cutting the GaAs LED's into small squares and using precession machinery placing the cut squares on a silicon chip. The LED's are then bonded to the pre-fabricated silicon circuit, the technique being very time consuming. Optical fibers are then bonded to the LED's and to photodiodes on the associated chip. The optical interconnects, because of their data transfer speed, create the illusion that the devices at the ends of the fiber optic line are located next to each other. This is important in the transfer of data between the processor, the registers, and memory. The farther away a memory source is, the longer the data transport time to the registers.

A simple fix which is currently being used is to place as much memory (L1 cache) on the same chip as the processor. However, by doing this, the cost of the manufacturing of a chip increases since the possibility of fab errors and the die size increase. Therefore, processor manufacturers usually opt to put as much memory as they can afford on the processor chip, and place the extra memory called secondary memory (L2 cache) off the main processor. Having two chips decreases the fabrication cost by using two smaller dies therefore reducing fab errors, but it also decreases the speed of data transfer, called memory latency. By using optical interconnects instead of standard copper wires, the delay time is significantly reduced, but as with adding more L1 cache the process increases the total cost of the chip.

Wave-guides can also be used to perform logic operations, switching, and modulation. This is accomplished by bringing two parallel wave-guides in close proximity and applying a stress to the area. The refractive index of the wave-guides, surrounding, or the connecting material are altered allowing signals to cross over between two parallel wave-guides or to change the phase of the light wave along one of the wave-guides, to create logic devices as shown in U.S. Pat. No. 5,150,242 to Fellows. It is also used in Mach-Zehnder interferometers and directional couplers as shown in U.S. Pat. No. 5,502,781 to Li, et al. The disadvantages of using wave-guides are that for operations to be performed the wave-guides may be a few centimeters long. This takes up valuable space on a two dimensional chip. An another disadvantage is the lossiness of each operation or cross over. Lossiness is the leaking of light out of the wave-guide into the surrounding medium, which weakens the signal. The lossiness can be lessened by many techniques. One example is using optical amplifiers as shown in U.S. Pat. No. 5,007,698 by Sasaki, et al. Logic operations can also be accomplished without wave-guides as shown in U.S. Pat. No. 5,159,473 to Feldman in which spatial light modulators and computer generated holograms create logic operations using free waves, where constructive or destructive interfering beams are formed on top of properly positioned detectors. The use of free wave optical computers have advantages over wave-guide driven computers, but free wave optical computers require precise aliment of the components unlike wave-guide driven optical computers, which are coupled, directly from a light source to a detector.

In 1990 it was discovered that porous silicon had photo-luminescence properties. In 1992 it was further discovered that if a current is applied to porous silicon it emits light. Because of this, less expensive silicon based computers and devices can be created using light as an information carrier. Currently, formation of porous silicon is done by stain etching or local anodization. The goal in the formation of porous silicon is creating pores that are uniform in size, shape, and distance apart, to better control its light producing and detection properties. The advantage of porous silicon is that it is much cheaper to form than the traditional optical semiconductors like GaAs.

To keep Moore's Law true, the computer industry must eventually switch from traditional design techniques to new manufacturing processes. A need is then not only to find and implement these new techniques to develop smaller and faster IC's, but also more importantly to create techniques to form newer, smaller, and less expensive electro-optical and pure optical devices.

DISCLOSURE OF INVENTION

It is, therefore, an object of this invention to provide a technique to control the placement or removal of groups or individual atoms between designated locations.

It is a further object of this invention to overcome the current problems associated with the fabrication of nanoscale devices by the use of an electric field to form high-resolution two and three dimensional patterns and devices.

It is a further object of this invention to provide a more substrate friendly way to create traditional micro and nano size devices.

It is a further object of this invention to keep the temperature used for the majority of the fabrication process of integrated circuits below 500 degrees Celsius.

It is a further object of this invention to form wave-guides with multiple cores surrounded by a common cladding.

It is a further object of this invention to form optical interconnects between individual devices so to be packaged as one functional component.

It is a further object of this invention to create optical wave-guides to form two or three-dimensional electro-optical or pure optical devices.

It is a further object of this invention to provide a technique for the deposition, doping, and the creation of dopant tunnels on or through a substrate without the use of a patterned mask.

It is a further object of this invention to provide a technique to connect individual layers of material.

It is a further object of this invention to provide a technique for the production of patterned masks for a conventional lithography process for nano and micro patterns.

It is a further object of this invention to provide a technique to mill micro machines and micro parts.

It is a further object of this invention to provide a technique to produce porous silicon and porous silicon devices.

It is a further object of this invention to create various types of Scanning Probe Microscopes to create images and maps of various substrate surfaces and hidden dopant formations underneath a substrate's surface and to calculate the capacitance of the substrate and its dopants.

It is a further object of this invention to create an economical way to correct fabrication errors.

BRIEF DESCRIPTION OF THE DRAWINGS

The invention will further be defined in the attached drawings and the advantages of the invention will be shown in non-limiting examples only, in which:

FIGS. 2(a) through 2(f) show examples of probe types.

FIGS. 7(a) through 7(c) shows one embodiment of the formation of porous silicon light emitters, detectors, and photocells.

DESCRIPTION OF THE INVENTION

Figure 1A:
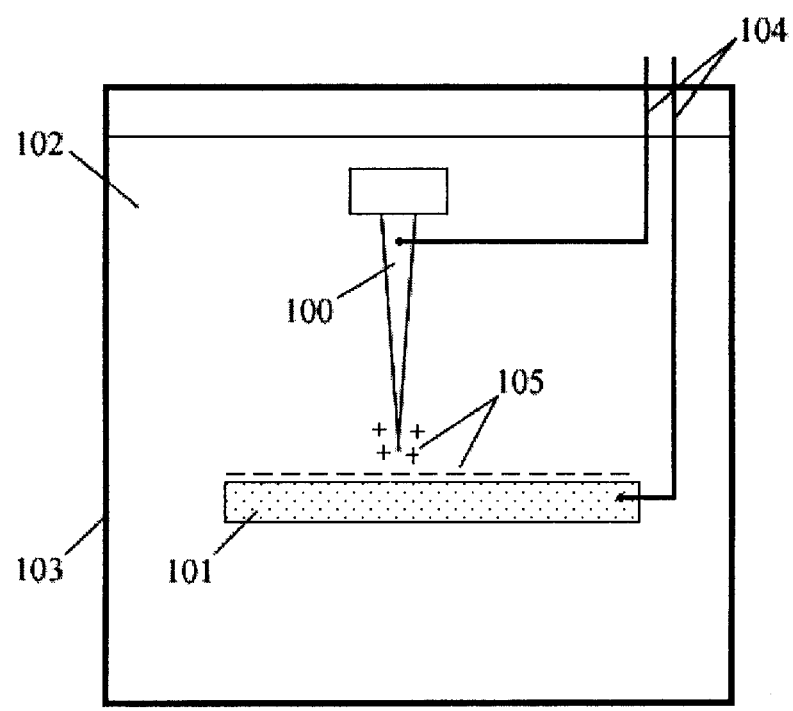
FIGS. 1(a) through (d) are schematic representation of prior art and one embodiment of the patterning components of the invention.

FIG. 1(a) is prior art, in which probe 100 and substrate 101 are submerged in a electrolyte solution 102. A voltage is applied to wires 104, which creates opposite surface charges 105 on probe 100 and substrate 101. The voltage is supplied in a very short pulse. Dependent on the direction of the applied voltage either pits can be created in substrate 101 or material can be deposited on substrate 101, formed by the reduction of ions from solution 102. In this process substrate 101 can not be an insulator, can use cantilever type probes, and can operate within or out of a medium, if used to etch materials.

As used herein, a "substrate" can be any form of soluble or insoluble insulator, semiconductor, polymer, dielectric, or any form of resist; it is the object that is being patterned, patterned on, or existing between the patterned objects. "Material" can be any single or group of elements, molecules, polymers, colloids, or resists that can be transformed, ionized or made into a dipole and be manipulated by an electric field or current; it is the object that is usually being patterned, formed or doped on or between the "substrate". A "medium" can be any form of solid, liquid, gel, vapor, gas, polymer, electrolyte, or vacuum; usually it is the substance that the "material" travels through to get onto or off of the "substrate" or the environment in which the electric field is located. Furthermore, a resist is not limited to a traditional lithographic resist used in the fabrication of integrated, but may also be any material that can have various of its physical or chemical properties altered within or by an electrical field.

Figure 1B:
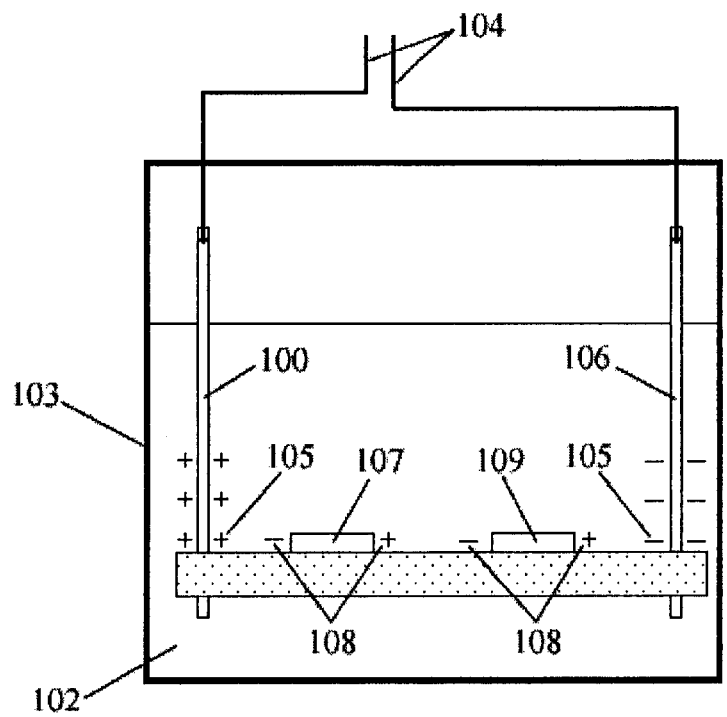

FIG. 1(b) is also a diagram representing prior art in which, probes 100 and 106 are place through or on either side of non-conductive substrate 101 in liquid medium 102. The high voltage applied to probes 100 and 106 create induced surface charges 108 on materials 107 and 109. Ions will be created and travel through medium 102 from one of the materials to the other depositing stray material onto substrate 101 and eventually linking materials 107 and 109 together. In this process substrate 101 can not be a conductor and must always be in a medium.

Figure 1C:
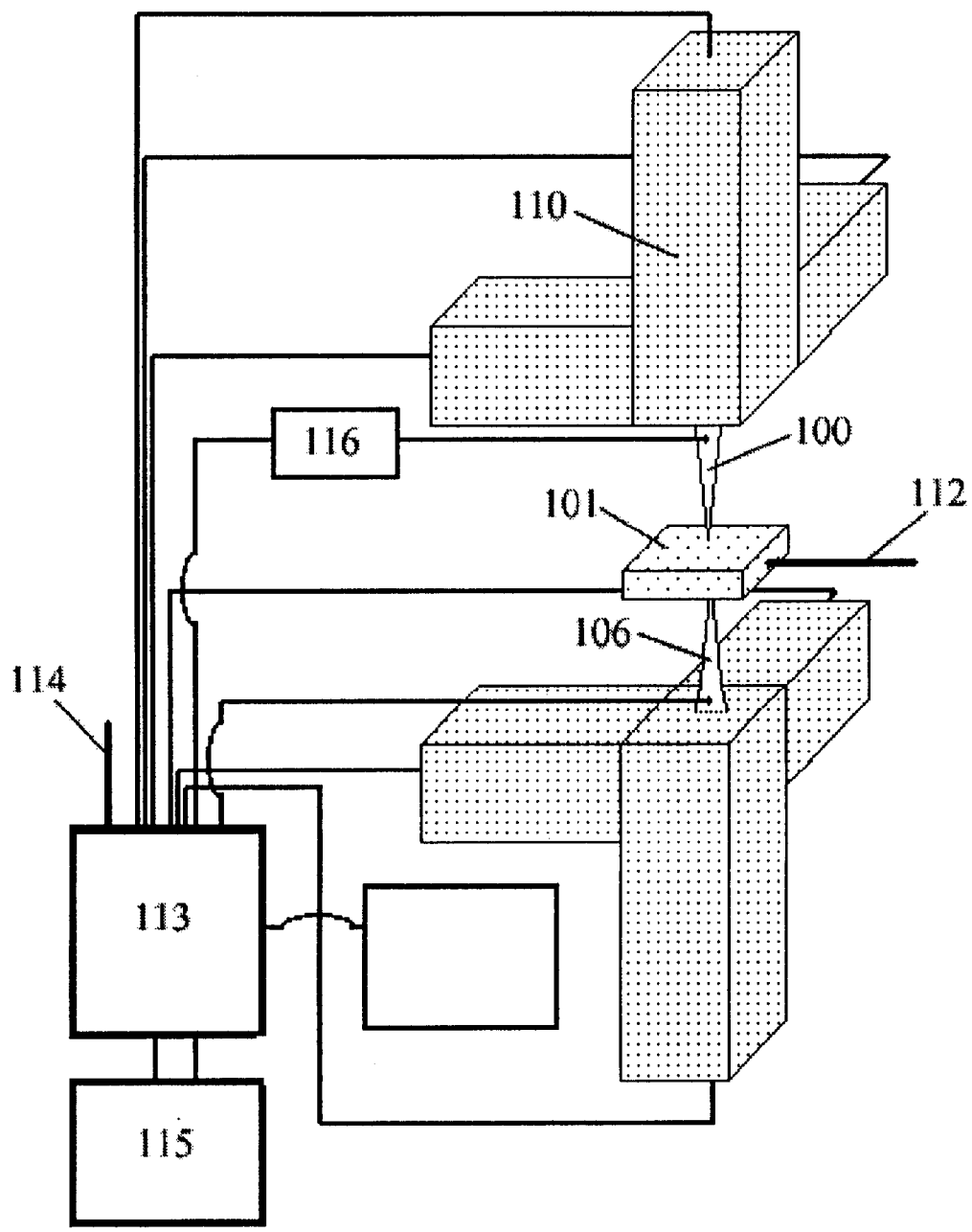
Figure 1D:
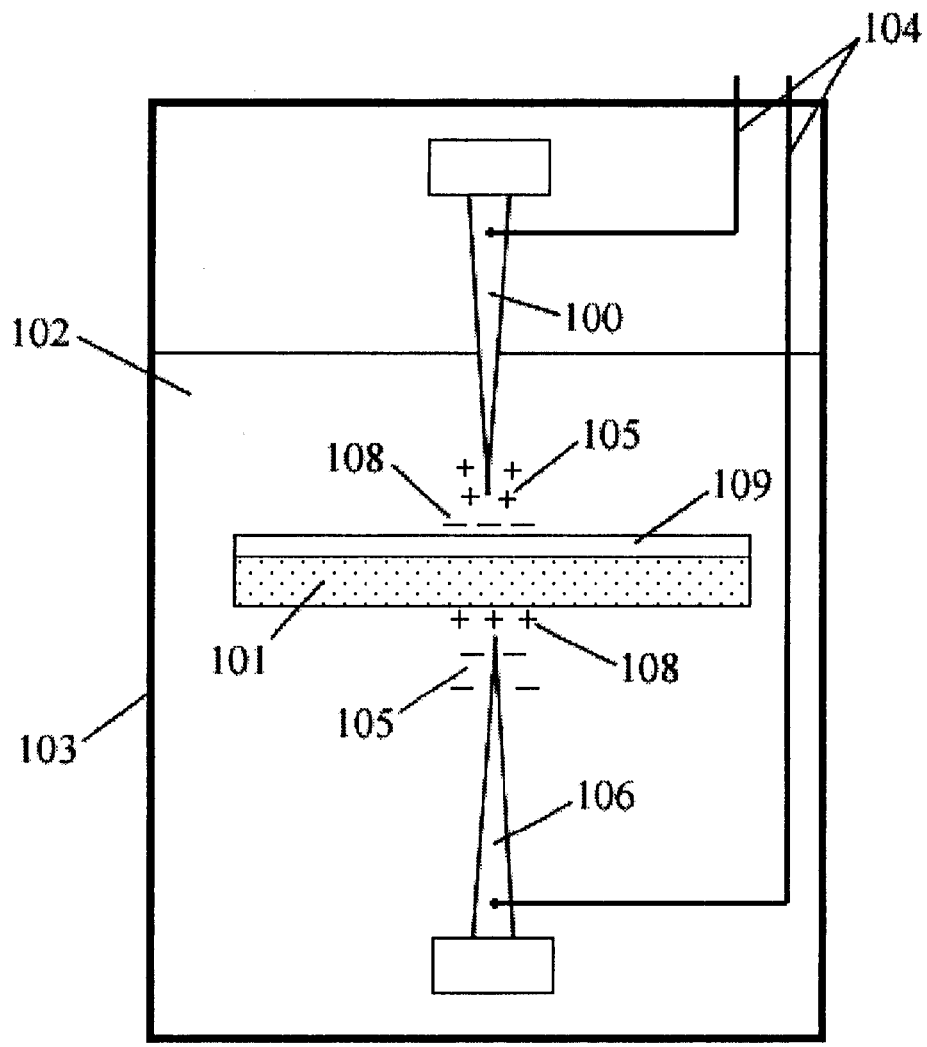

FIG. 1(c) represents a simplified schematic diagram of the patterning components of the invention, and FIG. 1(d) is a close up of the probe, material, substrate, medium, and created surface charges. Piezoelectric positioners 110 and 111 control the movements of two probes 100 and 106 which are aligned facing each other tip to tip. The probes 100 and 106 can be made from or covered with any material that will emanate an electric field. The tips can be any shape or size, but for the creation of fine nano-patterns they must posses a tip less than 10 angstroms. For rough patterning a wider tip can be used. The probes used can also be the cantilever types used in traditional STM's. The probes could be covered in an electric field blocking or damping jacket. An electric field, which is not shown, is produced between the tips of the oppositely charged probes 100 and 106. The charges on the probes do not have to be equal. A substrate 101 also lies between the two probes, it can be held in place by some insulated holder 112 or suspended by some force. The surface of the substrate 101 can be covered with a medium and a material. Material 109 can be imbedded, mixed, or deposited on the medium. Material 109, as shown in FIG. 1(d), can also be place directly onto the substrate 101 and removed into the medium 102. The electric field changes the material into ions that are accelerated towards the substrate 101. The electric field is set to the ionization energy required to remove a valance electron in the material. The electric field could also be set lower, in which case the electron can be removed by the tunneling effect. At higher field strength, the material itself may be completely vaporized off the substrate 101.

A computer 113 controls the path, polarity, and distance from the surface of the probes 101 and 106. Meters 115 connected to the computer 113 monitor the voltage and current between the probes 100 and 106. The computer 113 can also be branched out through line 114 to control a multiple array of patterning devices.

The invention can also be used as a SPM, by measuring the tunneling current between one probe and the induced surface charge 108 created on substrate 101's surface. This technique can be used to form a picture of the substrate 101's surface. Unlike a traditional SPM in which the substrate 101 must be a conductor, the substrate can be any material that possesses an induced surface charge. A cantilever type probe can replace probe 100 allowing the invention to act like a standard atomic force microscope (AFM) to also allow the measurement of the variations of the induced surface charge 108 across the surface of substrate 101. Probe 100 is connected to a tunneling current amplifier 116 connected to the computer 113 and to a visual display 117. Using this technique, a variety of tunneling currents or electron beams can be produced to image or manipulate and object or surface. The currents produced are from probe 100 to substrates 101's induced surface charge, the tunneling capacitance current between the two oppositely charged surface charges on substrate 101, the current from probe 106 to its induced surface charge 108 on substrate 101, and the current produced from probe 100 to probe 106 through substrate 101 and material 109.

Figure 2D:
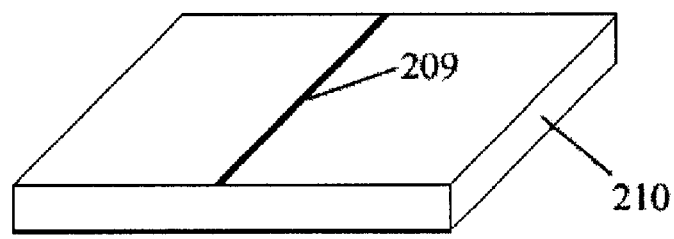

Diagrams of a few types of charged probes that may be used are shown in FIGS. 2(a) to 2(f). Probe 200 in FIG. 2(a) is a fine patterning probe where the tip 202 is an atom thick. Probe 200 is covered in an electric field dampening jacket 201, where only a few atoms of the probe's tip 202 are not covered. Jacket 201 prevents the electric fields maximum potential of ionization to widen in area if the potential is increased. Covering the tip 202 of the probe in a resist and removing it after the jacket 201 is applied forms the formation of the jacket 201.

A jacket 204 can also surround the tip 205 shown in FIG. 2(b). This is done by covering the tip in a resist and coating the resist and probe with the jacket. The tip of the probe is cleaved exposing the resist. The resist is then removed leaving probe 203 with a walled tip. Probes 200 and 203 can also have a flat tip used for rough patterning, in which the tip can be the size of the area being removed or patterned. Probe 206 is a razor probe shown in FIG. 2(c) where the edge 207 is made as fine or as wide as is required. Probe 206 must be a few times longer in length than the diameter of the substrate 208 so that the electric fields at the ends of the probe do not interfere with the patterning process, and a jacket can also cover probe 206 if required. The probes can also be coated with other materials in addition to the jacket to alter the probe's electrical properties, or left bare without a jacket.

Figure 2E:
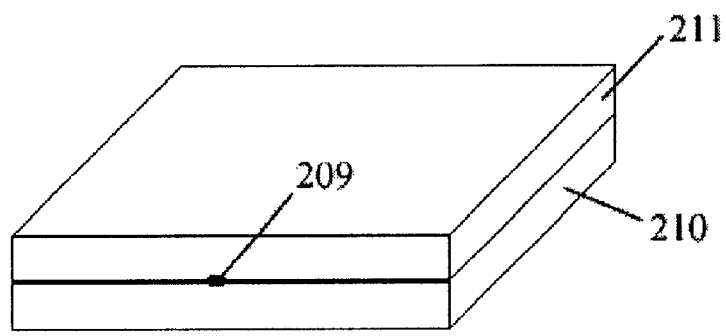
Figure 2F:
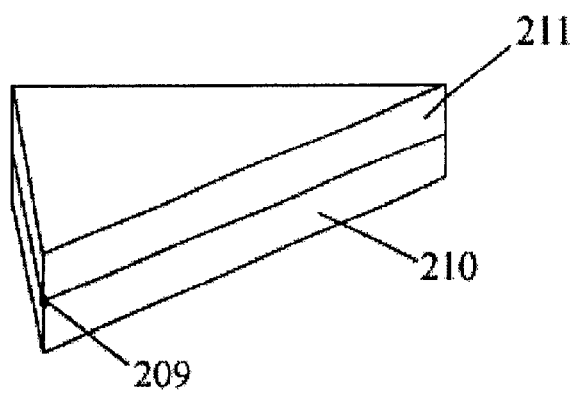

FIGS. 2(d) through 2(f) show another type of probe. A very thin film at least an atom thick of conductive material 209 is deposited on a nonconductive substrate 210. The film can have any width but must be applied as thin as possible while still remaining conductive through out. A second layer of nonconductive substrate 211 is placed on top of thin film 209 and substrate 210 as shown in FIG. 2(e). The layers can be cleaved in a variety of ways creating points as shown in FIG. 2(f) or thin lines shown in FIG. 2(c). All said probes will be connected to a power supply to produce the required electronic fields and current required by this invention.

Figure 3A:
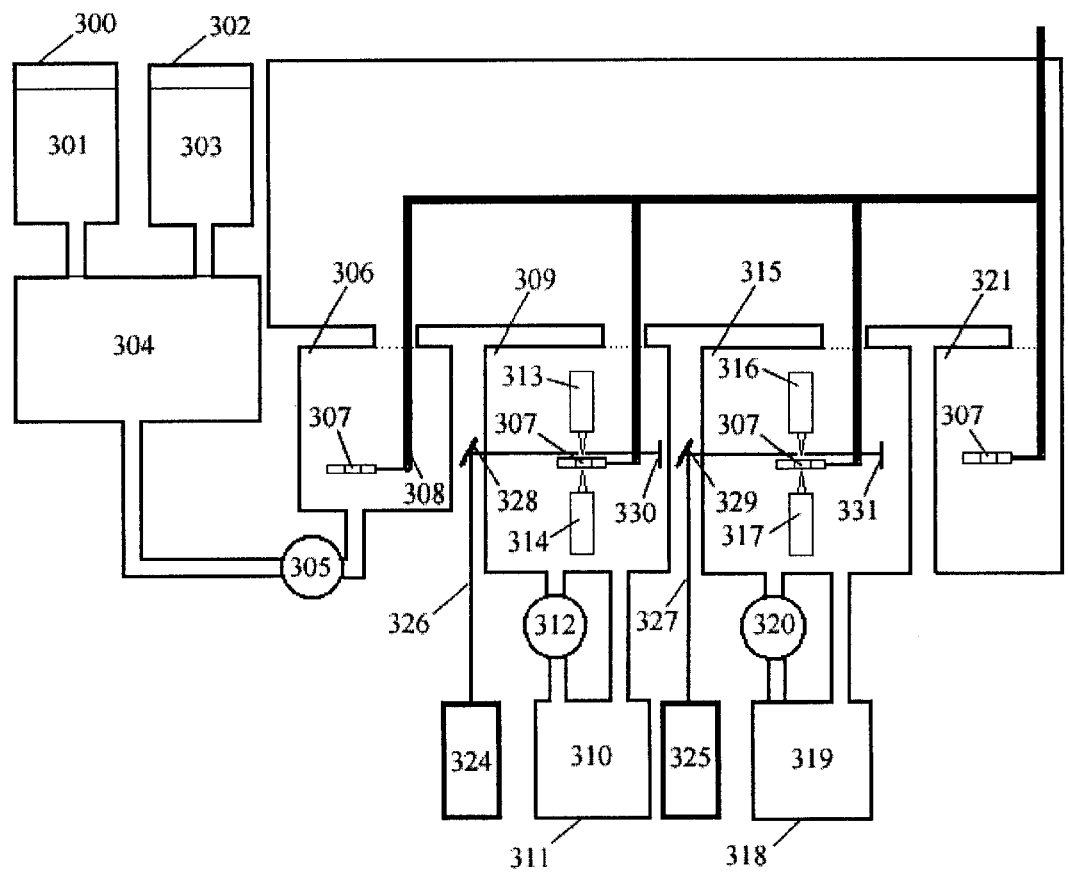
FIG. 3 shows a diagram of one of the embodiments of one of the possible fabrication processes of the invention.
Figure 3B:
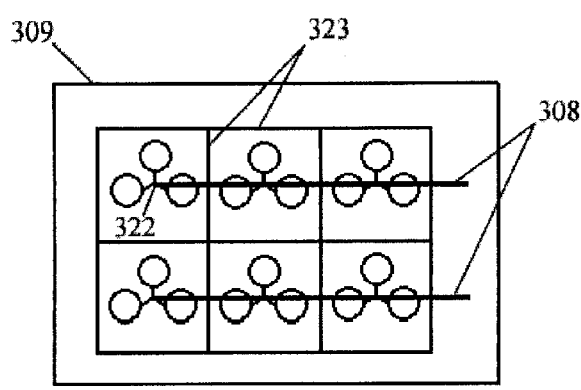

FIG. 3 is a simplified diagram of an embodiment for the fabrication components of the invention. Container 300 holds a medium 301, container 302 contains a material 303 which are mixed in container 304. The material 303 and medium 301 can be mixed as liquids or as a vapor. The material 303 and medium 301 are transferred to area 306 by pump 305, which is applied onto the substrate 307. The material 303 and medium 301 can also be placed directly onto the substrate 307 individually. The substrate 307 is held and moved by arm 308 in area 306. If just a medium is placed onto the substrate like a resist it can be hardened and moved to area 306 where a layer of material can be deposited onto the substrate from container 304. The material 303 and medium 301 can be deposited on the substrate 307 by any variety of deposition techniques. The arm 308 can rotate and spin to evenly distribute the deposited coatings. After deposition the substrate 307 is then moved to area 309 where a second liquid medium 310 from container 311, circulated by pump 312, exists. Area 309 is where the patterns are rough-cut by probes 313 and 314; rough cutting removes large areas at a time. The substrate 307 can be returned to area 306 where the substrate 307 can be cleaned and re-coated with a new material and medium. The substrate 307 can then be transferred to area 315 where the rough patterns are further etched to the final patterns using probes 316 and 317. From container 318 liquid medium 319 is circulated with pump 320 through area 315. Finally the substrate is moved to area 321 where excess medium and materials are removed.

The above steps can be repeated until the desired device is created. The device is then moved to where it will be packaged. Unlike traditional fabrication each device is created individually and not on a single large wafer with a group of other similar devices which will later be cut into smaller individual units. The substrate 307 is cut or formed in the shape or size required by the end product. Because of this, smaller, less expensive, better quality substrates can be used.

Since each device is created individually, the whole probe mechanism can be part of a revolving arm 322 connected to arm 308, in which different probes can be interchanged to pattern different objects onto or off the substrate. In multi device patterning the areas are broken up into cells 323 that have electric field dampening walls. A top view of the cells in area 309 is shown. The number of cells allowed is not limited. This is ideal since creating a working marketable computer processor, for example, would take a few days to a week. However, since one computer can be connected to a group of individually powered arms which are each connected to a group of probes, a very large amount of devices can be fabricated. The cost of a slow production time for each individual device can be offset by the quantity produced at one time. The probes do not have to exist in the areas but they can also exist out of the areas so to be easily interchanged with other probe types. Therefore less patterning areas will be required. A conventional laser trap and cooling set up 324 and 325 can also be used to help with the patterning. The laser light 326 and 327 is reflected off mirrors 328, 329, 330, and 331 and directed into patterning areas 309 and 315 creating a standing wave over substrate 307.

Formation of deposited patterns

Figure 4A:
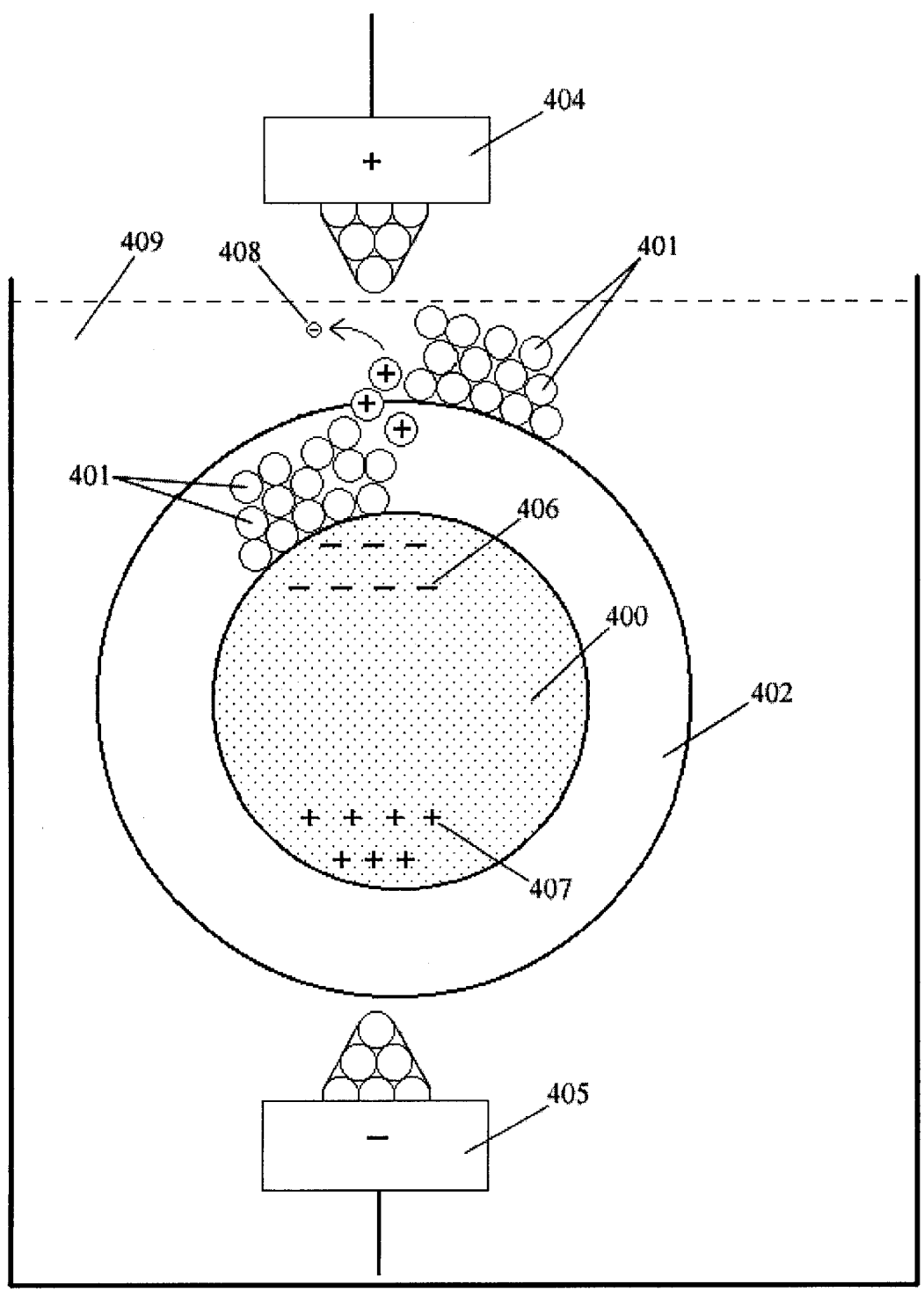
FIGS. 4(a) and 4(b) are schematic representations of embodiments of two possible deposition techniques according to this invention.

In one formation of the embodiment of the pattering of a substrate 400, as shown in FIG. 4(a), a material 401 is placed on a solid medium 402. In this embodiment the medium 402 can be a gel, solid, or porous solid. The medium 402 is heated to a temperature just below that needed to make the material 401 diffuse into the medium 402 naturally. By heating the medium 402 below the required temperature for diffusion, the ions 403 can be pulled and deposited at a predictable rate. The probes 404 and 405 are positioned, and an electric field, not shown, is created between the probes 404 and 405. The field creates opposite induced surface charges 406 and 407 in the substrate. The field pulls electrons 408 from the material 401 into a second liquid medium 409. The probes can be in or out of the second medium 409. The liquid medium 409 may be an electrolyte or a substance that can be made into a dipole in the presence of an electric field. The newly created ions 403 are pulled through the medium 402 and collect on the surface of the substrate 400. The ions become neutral by accepting an election from the substrate 400 surface. A conventional laser trap device, not shown, can be used to keep the ions in tight formations as they move through the medium. Traditional cooling laser devices can also be used to keep the probe tips 404 and 405, liquid medium 409 and substrate 400 cool. The technique shown in FIG. 4(a) is also valid if the material 401 was imbedded or mixed into the medium 402. When the pattern has been formed, the substrate 400 can then be removed from the liquid medium 409, and heated to anneal the deposited material 401, if required in the process. The excess medium 402, material 401, and ions 403 are removed using a chemical process. The above steps can be repeated if needed with the same or different materials. The substrate is shown spherical since on a flat surface the created patterns will block the laser light if used. On a spherical surface the substrate can be turned and the deposition area is not shadowed by existing deposited structures.

Figure 4B:
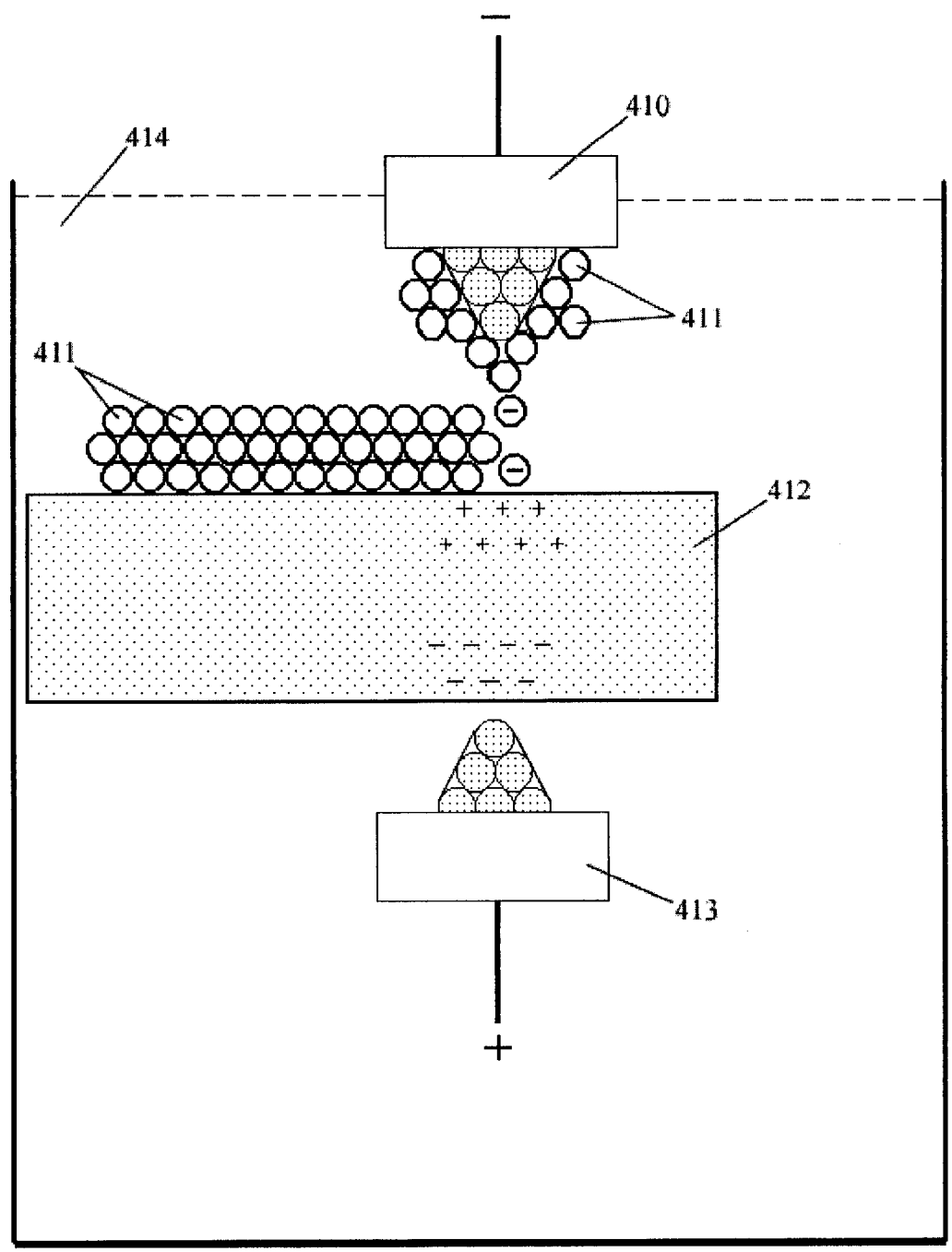

FIG. 4(b) is another embodiment of this invention. Probe 410 is covered in the material 411 that is to be deposited on substrate 412. When the field is applied between probes 410 and 413, material 411 is pulled off of probe 410 and travels through medium 414 to be deposited on substrate's 412 surface. In this embodiment probe 413 possesses a higher charge than probe 410. This allows the material on probe 410 to be removed. Material can also be deposited on substrate 400 or 412 by pulling the material out of the medium itself.

Removal of previously deposited material

Figure 5A:
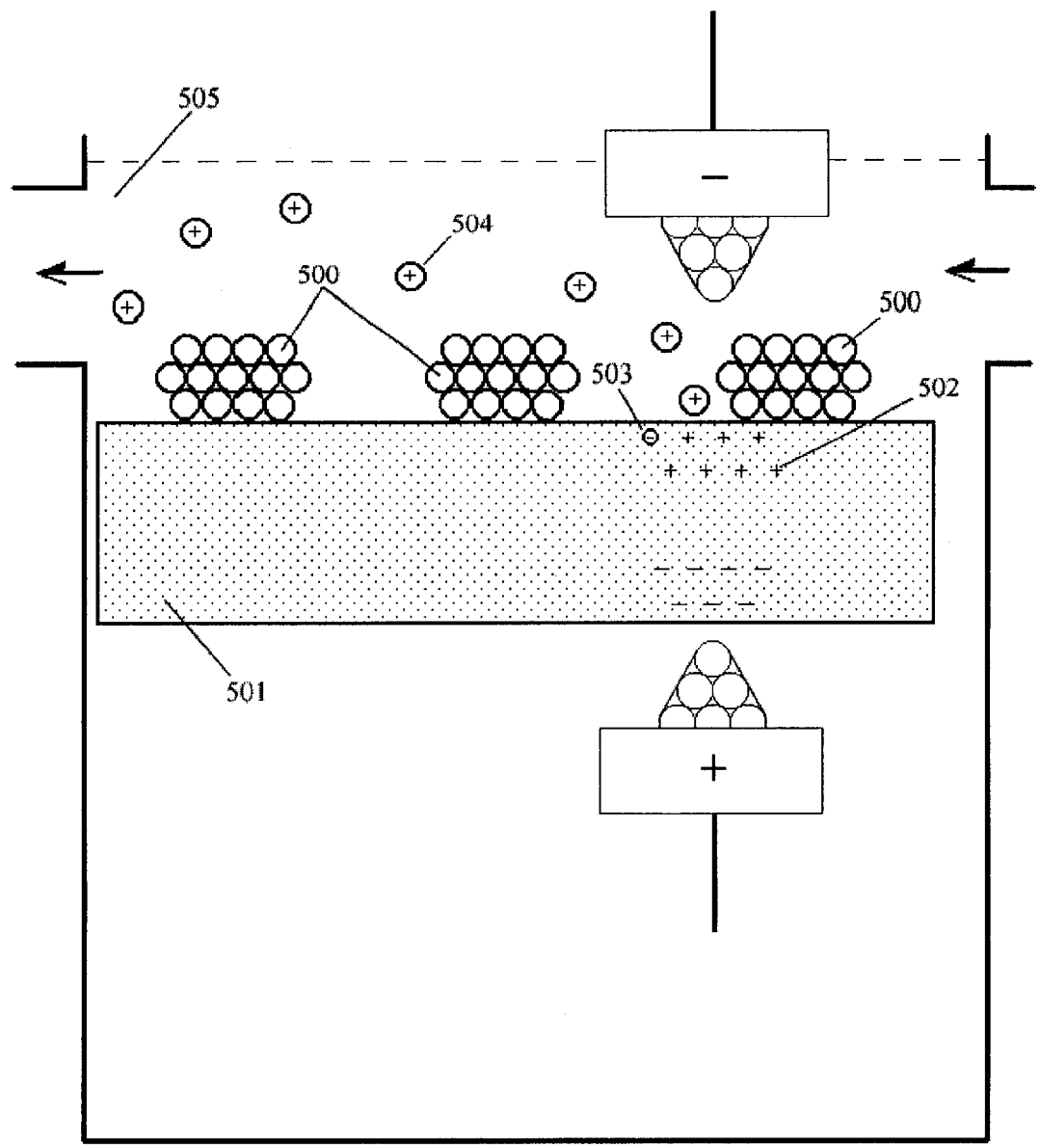
FIGS. 5(a) and 5(b) are schematic diagrams of two possible embodiments according to this invention for the milling technique for micro parts or the patterning of a pre-deposited and annealed material.

In another embodiment, an existing material 500 can be removed from a substrate 501, as shown in FIG. 5(a). The existing material 500 can be placed on the substrate 501 by any means required to create a layer of uniform and desired thickness. The set up is the same as FIG. 4, except that the polarities of the probes have been reversed, creating a positive induced surface charge 502 under the material 500. Electrons 503 are transferred to the substrate 501, creating ions 504 that are carried away in a swift flowing medium 505 controlled by a pump. The substrate can be a commercially used resist that can later be dissolved freeing milled micro parts. The procedure can also be used to create patterns on a substrate. This technique and the one above are very gentle to the substrate and its surface unlike the prior art in which using high temperatures or using a high-energy fabrication process can damage the substrate and its surface.

Figure 5B:
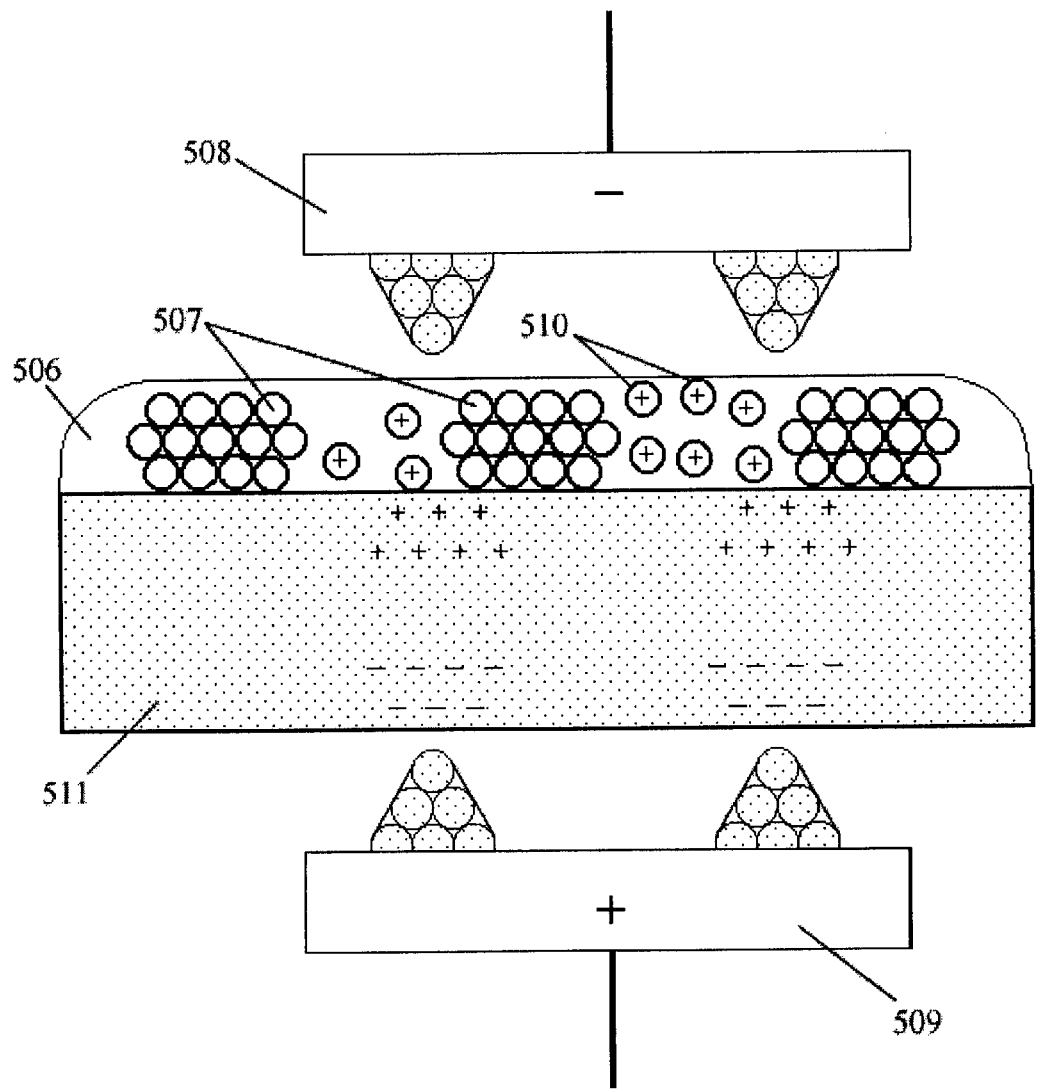

In still another embodiment of this invention a thin film 506 is used as a medium, as shown in FIG. 5(b). As material 507 is removed by the electric field between probes 508 and 509 it moves into the thin film 506. Since both probes are located out of the medium the removed material 510 will not foul the probes tips. The thin film 506 is removed when the desired region is patterned or saturated with the removed material 507. The surface of substrate 511 is cleaned and thin film 506 can be reapplied and removed again as required to form the desired pattern or device.

Formation of dopant tunnels

Figure 6A:
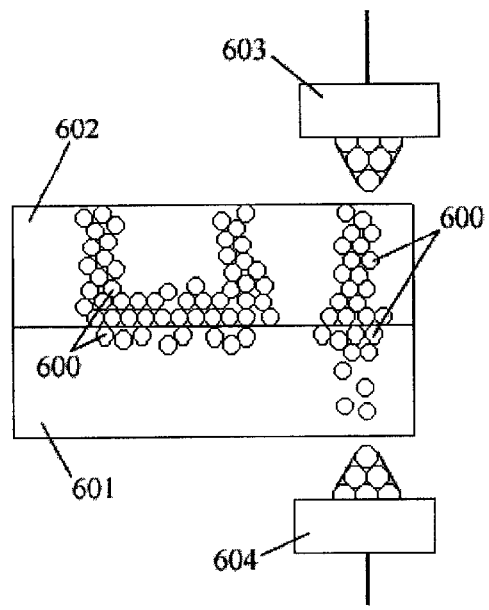
FIGS. 6(a) to 6(f) are cut away views of schematic diagrams of the dopant tunneling between, the connecting of two substrates, and the doping of material into a substrate according to one embodiment of this invention.
Figure 6B:
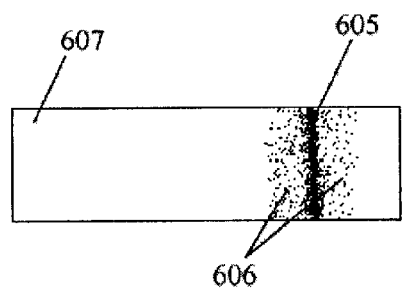
Figure 6C:
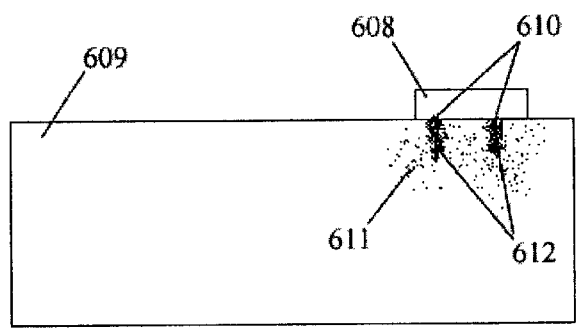

FIGS. 6(a) through 6(c) are embodiments of this invention in which this technique can be used to dope substrates and form dopant tunnels and the doping of materials into a substrate. FIG. 6(a) shows a material 600 already patterned onto substrate 601. A second substrate 602 is grown or deposited on top of the first substrate 601. The substrates 601 and 602 are heated just below the diffusion temperature of the material 600. In a set up similar to FIGS. 3 and 4, an electric field is produced between the probes 603 and 604. Ions are created as electrons are moved to the substrate surface and removed into a liquid medium. The ions move to the surface of the negatively induced charged substrate surface. If the ions do not emerge to the surface, another substrate can be added to relocate the induced surface charge and later removed. The substrates 601 and 602 can also be mechanically cleaved or chemically etched to expose the dopant or the polarity of the probes 604 and 605 can be oscillated until a desired dopant level is reached. Tunnels through only one substrate or tunnels through both substrates can be created. The tunnels may also be interconnected.

FIG. 6(b) shows the dopant tunnel 605 formed inside another dopant tunnel 606. These formations allow the passage of a current through the inner tunnel 605 without having the current leak out into the surrounding doped substrate 607. This creates dopant wires within the substrate. In this set up 607 is p-type substrate, dopant 605 is a n-type, and 606 is also a p-type.

Figure 6D:
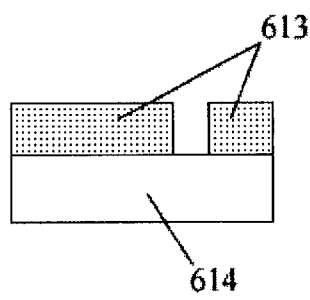
Figure 6E:
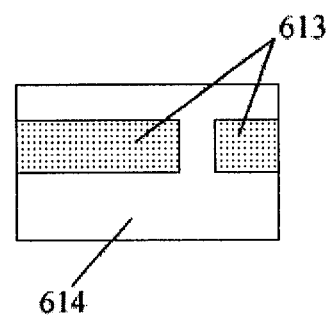
Figure 6F:
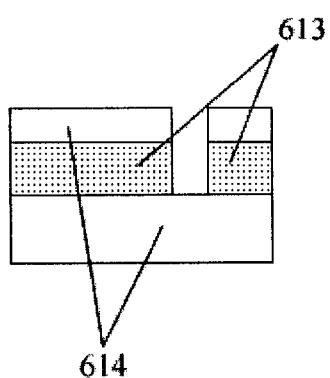
Figure 6G:
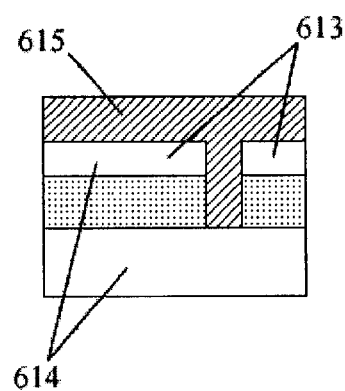

The technique as shown in FIG. 6(c) is used to pull material 608 under the surface of a doped substrate 609 creating small dopant areas 610 which may form connections to more traditional integrated devices. Using this technique the amount of material 608 pulled into substrates 609 and the size of the diffusion area can be predicted. In this set up 609 is a n-type substrate, 612 is a n-type dopant, and 611 is a p-type dopant forming a traditional n-p-n transistor. FIGS. 6(d) and 6(e) show the connecting of two substrates. In a technique as shown before in FIG. 5 a hole is created in material 613 existing on top of substrate 614. A second material, that can be same as substrate 614, is placed on top of material 613 filling in the created hole and bonding to substrate 614 forming one whole substrate separated by material 613. FIGS. 6(f) and 6(g) are also representations of a technique to connect two substrates. Substrates 614 can have pre-pattered or formed devices on them. A tunnel is formed between the substrates and a third substrate 615 is deposited connecting substrates 614 together. This process can be used to connect substrates 614 and 615 or other various substrates electrically.

Formation of patterned pores, spikes, and oxide on a silicon substrate.

FIGS. 7(a) through 7(c) represents the formation of one embodiment of this invention for the formation of a porous silicon cell. The cell can be used as a light emitting or detecting diode. The probes 700 and 701 are placed facing each other on either side of a clean and polished silicon substrate 702 that has been treated so that all the dangling silicon surface bonds have been attached to hydrogen atoms. In this procedure the created electric filed will break the hydrogen bonds and the exposed the silicon surface. The exposed areas will oxidize, creating a layer of silicon dioxide 703. The thickness and width of the oxide layer is dependent on the strength of the electric field and time between the probes.

After the desired patterns are made the newly formed silicon dioxide 703 can be removed using a chemical process creating a hole 704 in the substrate 702. This creates a laser diode. The whole cell, a group of holes, or each individual hole can then be linked to a power or detection device. The cells or holes can be connected to one another or to other integrated circuits to form new computer components. The created oxide layer can also be used in the formation of traditional integrated circuits. Placing silicon substrate 702 and probes 700 and 701 in a liquid medium containing hydrofluoric acid can also form silicon formations. The electric field will produce spike like objects 705 on the silicon surface. This will form a photocell. The cell can then be hooked up to an appropriate device.

Formation of optical interconnects

Figure 8A:
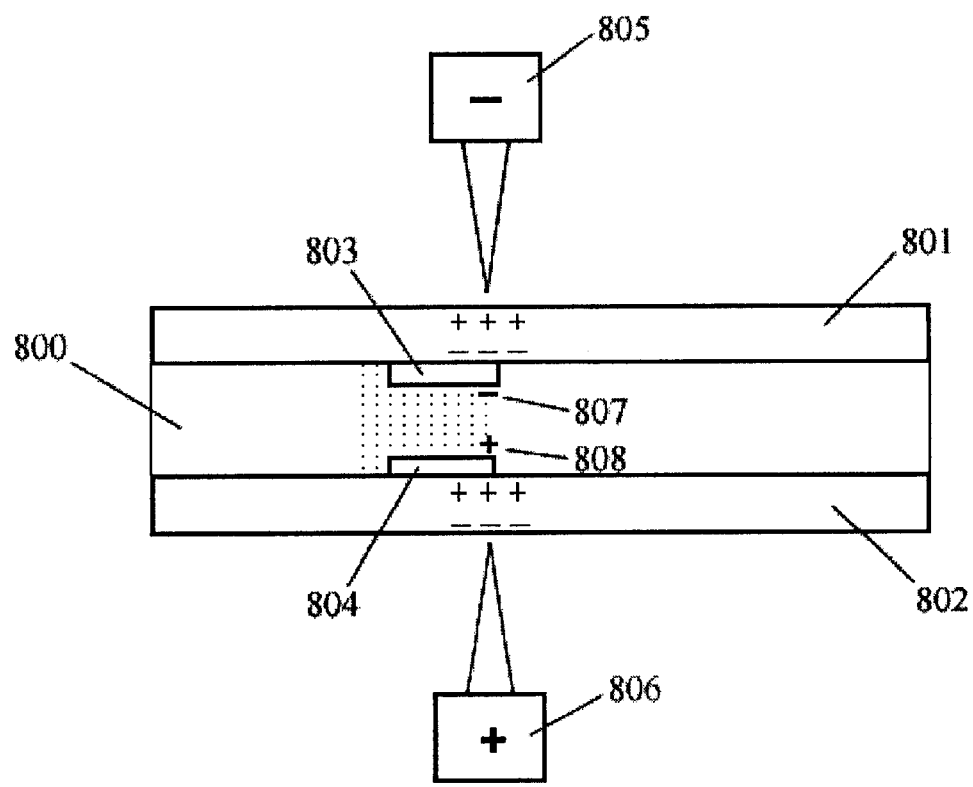
FIGS. 8(a) through 8(g) are cut away views of embodiments of this invention in forming optical interconnects between two individual devices or two fully formed chips, and also the exposing of resists on a substrate's surface.

In another embodiment of this invention shown in FIG. 8(a), a baked transparent e-beam resists 800 lies between two semiconductor substrates 801 and 802. The semiconductors 801 and 802 are lined up so that desired light sources 803 and detectors 804 are face to face. The two probes 805 and 806 are placed on either side of the light source and detector. As the field increases between the probes, surface charges form on the substrate and material. Increasing the field, while cooling the devices to prevent diffusion into the resist, will eventually create a tunneling current between probes 805 and 806 and the two greater surface charges 807 and 808 located on the formed devices exposing the resist in between.

Figure 8B:
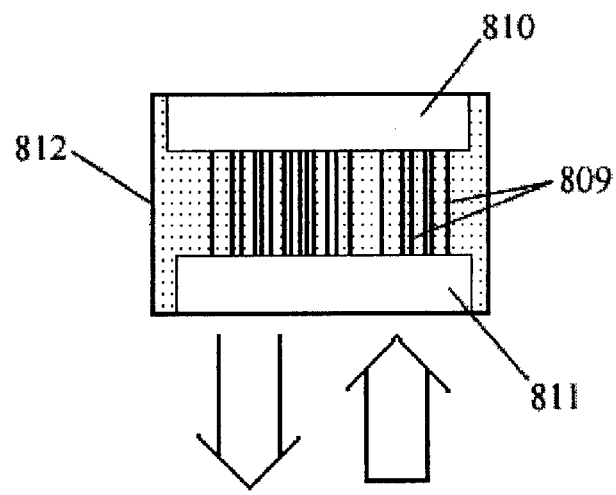

In still another embodiment as shown in FIG. 8(b), this process can be used between many individual devices on functional chips. An example would be to form optical interconnects 809 between CPU 810 and memory chip 811. The chips can be placed face to face, connected, and packaged into one unit 812, taking up less space than prior art CPU-L2 cache interconnect configurations.

Figure 8C:
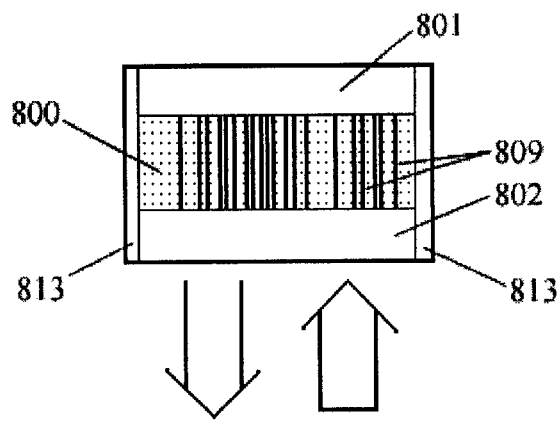
Figure 8D:
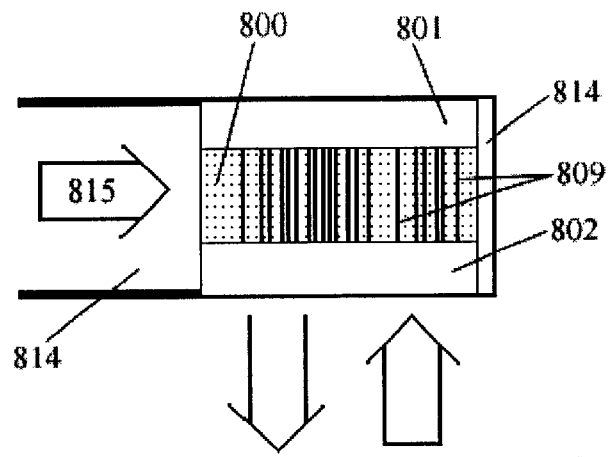
Figure 8E:
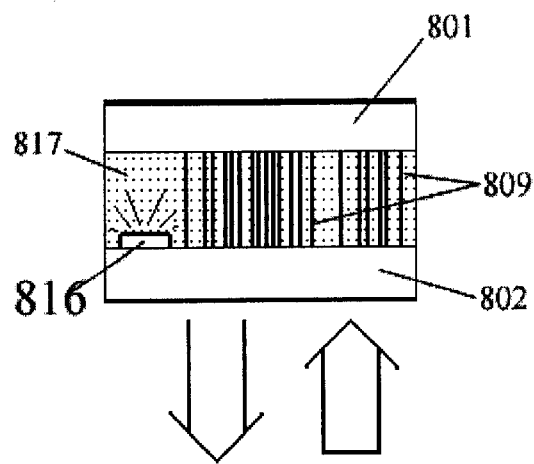

In another embodiment of this invention shown in FIG. 8(c) a layer on material 813 with a higher index of refraction than resist 800 are connected to each other. Any lossiness created within the working device can leak into material 813 and be trapped, reducing the signal to noise ratio through cores 109. FIG. 8(d) is another embodiment of this invention in which the outer layer of material composes of wave-guide 814, which possesses a lower index of refraction than resist 800. Resist 800 can then be pumped using wave-guide 814 and laser light 815, strengthening the signals exchanged between the devices traveling along formed cores 809, so to allow the original emanating signal to be weaker. The laser light along wave-guide 814 can also pulse creating a clock signal. FIG. 8(e) is another embodiment of this invention in which a LED or laser device 816 is located within cladding 817. Device 816 or a group of devices can be turned on or pulsed, to amplify signals or to create signals through cores 809. The light created will be confined within cladding 817 by total reflection.

Figure 8F:
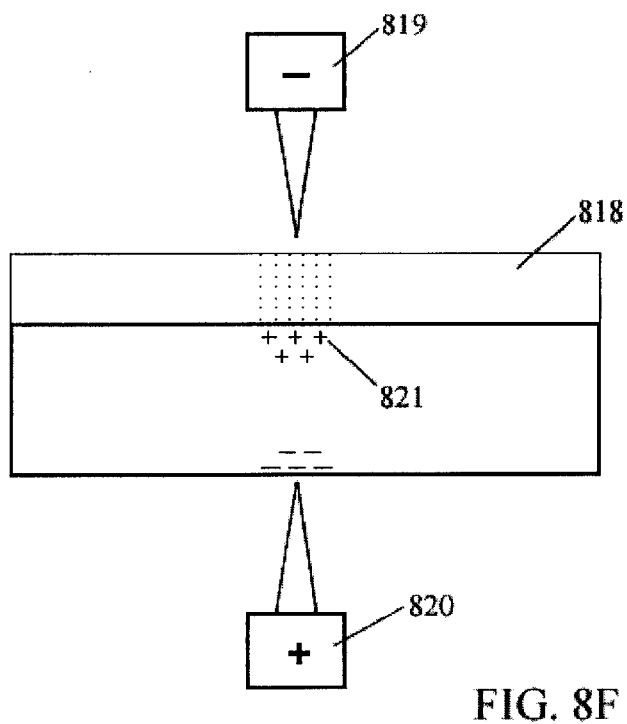

In another embodiment of this invention shown in FIG. 8(f), a resist 818 is exposed by an e-beam that is formed between the two probes 819 and 820 or between probe 819 and the induced surface charge 821.

Figure 8G:
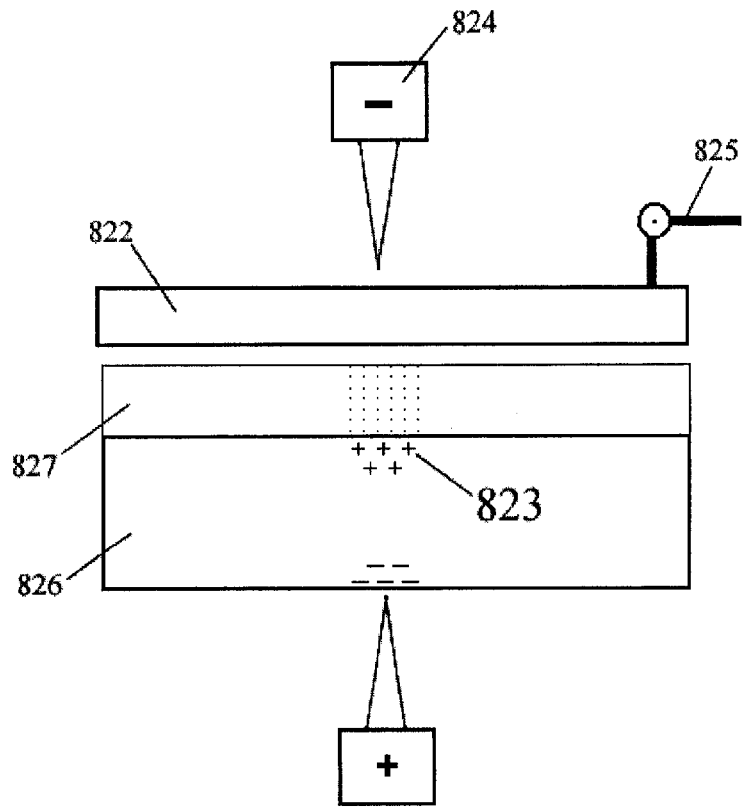

The technique can also be used with a mask 822 in FIG. 8(g). If mask 822 is used the surface charge 823 can be used to better direct an e-beam emanating from probe 824 or some other e-beam source. Mask 822 can be connected to arm 825 that move the mask 822 over substrate 826 and resist 827. Probe 824 can also move with mask 822 or a larger e-beam source can used covering the whole surface to be patterned as used in traditional e-beam lithography techniques. Other types of resist can also be used in which the electric field changes the resist properties, such as its color, level of transparency, shape or chemical structure.

Formation of logic circuits

Figure 9A:
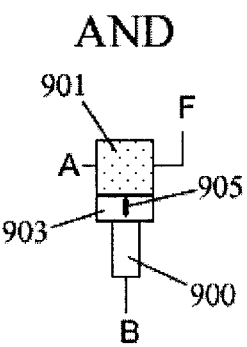
FIGS. 9(a) through 9(k) are some of the embodiments of the invention to connect photo diodes, phototransistors, photocells and traditional transistors to create programmable integrated logic circuits using resist wave-guides.
Figure 9B:
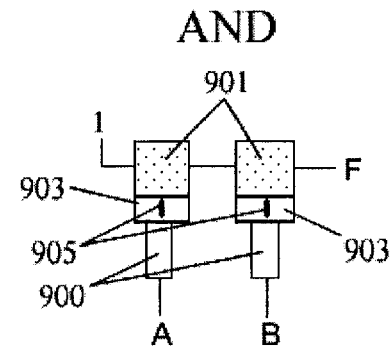
Figure 9C:
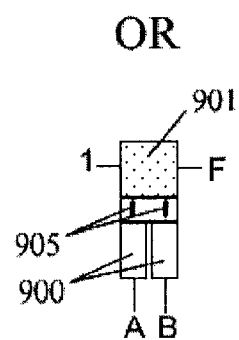
Figure 9D:
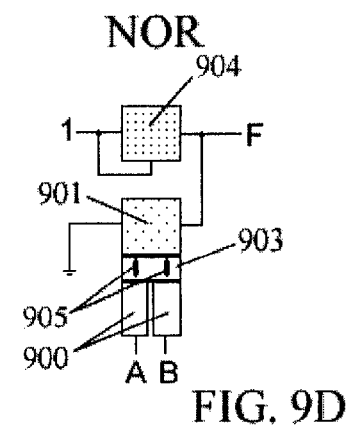
Figure 9E:
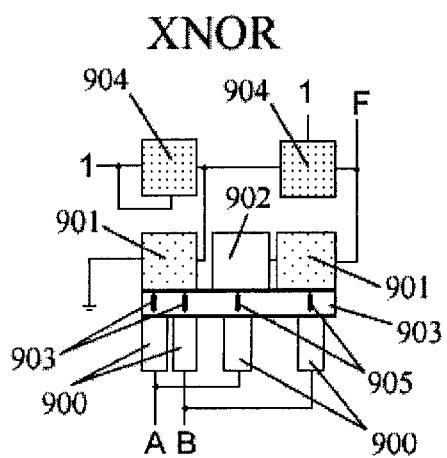
Figure 9F:
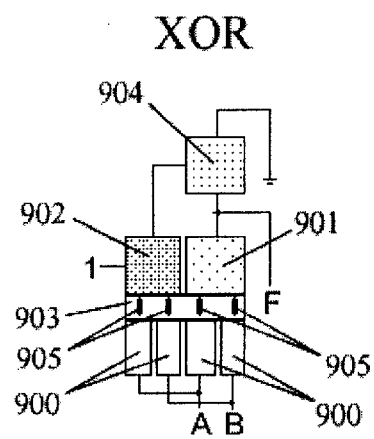
Figure 9G:
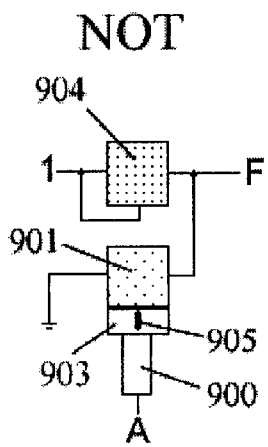
Figure 9H:
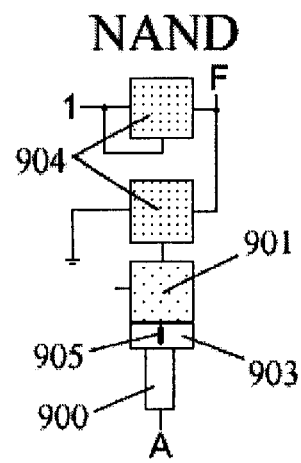
Figure 9I:
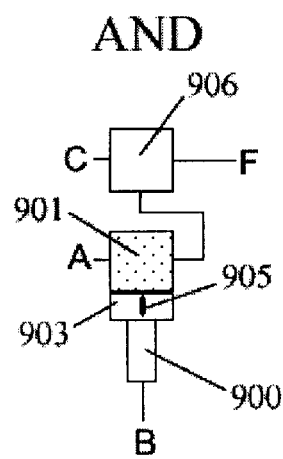
Figure 9J:
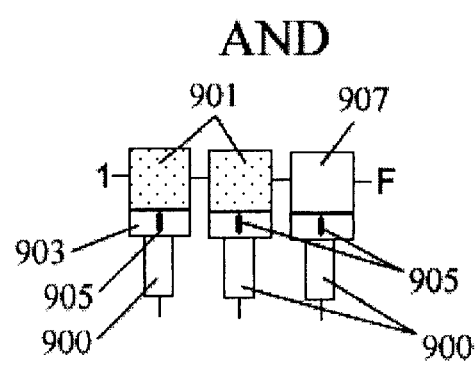
Figure 9K:
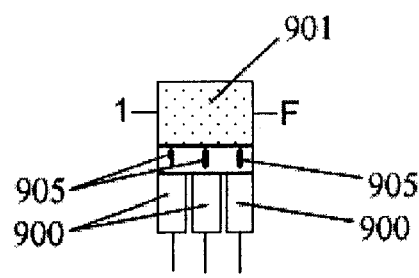

In another embodiment of this invention porous silicon devices or any other light-producing devices can be used in conjunction with other integrated circuits forming logic circuits, as shown in FIGS. 9(a) through 9(k). The logic path is formed by facing an operational laser cell 900 or diode toward the base of an operational phototransistor 901 or a photocell 902, which are connected to a traditional transistor 904. A baked transparent resist 903 lies between the two semiconductor substrates as shown before in FIGS. 8(a) and 8(b). Charged probes are then positioned over the cells that are going to be connected exposing an area of resist between or around the cells forming a wave-guide 905 between the devices. The cells can be stacked and linked in a variety of positions to create different logic formations. FIGS. 9(a) though 9(k) are two-dimensional representations of logic circuits. In a three dimensional perspective, objects with the shown interconnects 905 are over each other, and objects separated by the resist 903 lie on the same plain. A plurality of signal inputs can be easily added to the logic gates. For example, a second transistor 906 or phototransistor-laser cell 907 set can be added to the basic AND gate to allow for a third signal input, FIGS. 9(i) and 9(j). Increase the area of the phototransistors base and add a third laser cell over it expands an OR gate, FIG. 9(k). This expansion can be done for all the shown logic gates.

In another embodiment of the invention the constant on input signal labeled as 1 does not have to be an electrical current, but can be a steady incoming light ray. The input signals A, B, C . . . can activate a photovoltic, piezoelectric, or other interface that in turn changes the optical properties of a non-linear organic polymer. The orientation of the polymer will then determine what the final output signal is at F.

Formation of layered optical and electro-optical devices

Figure 10A:
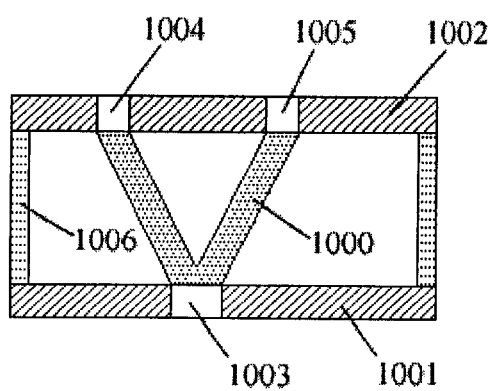
FIGS. 10(a) through 10(f) are other embodiments of the invention to form programmable optical interconnects, switches, and Mach-Zehnder interferometers, using layers of resist, varying materials, and formed IC devices.
Figure 10B:
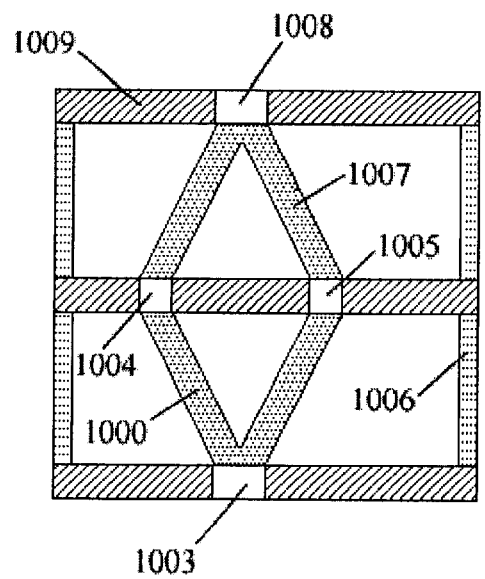

FIGS. 10(a) through 10(b), show an embodiment of this invention, in which a Mack-Zehnder interferometer is made. Resist 1000 is baked between two optical substrates 1001 and 1002, such as gallium aluminum arsenide, indium gallium arsenide phosphide, or lithium niobate. Window or light source 1003 and windows 1004 and 1005 are then created through the substrate by diffusion of certain materials. In the creation of windows in lithium nobate, titanium is used as a dopant. Using the probes the resist is exposed linking the windows 1003 to windows 1004 and 1005. The unexposed resist can be removed, leaving behind the wave-guide plus any needed supports 1006. Around window 1004 or 1005 exists an integrated device that will change the phase of the light traveling through wave-guide 1000. The second layer is formed using the same technique as the bottom layer. The light traveling along wave-guide 1007 going to window or detection device 1008 will be dependent on the lights phase along the two slit paths. If the light's phase is changed along one of the paths, it will create destructive interference at window 1008 and the light will not be detected. If it remains unchanged along both paths, the light will recombine constructively and the light will be detected.

Figure 10C:
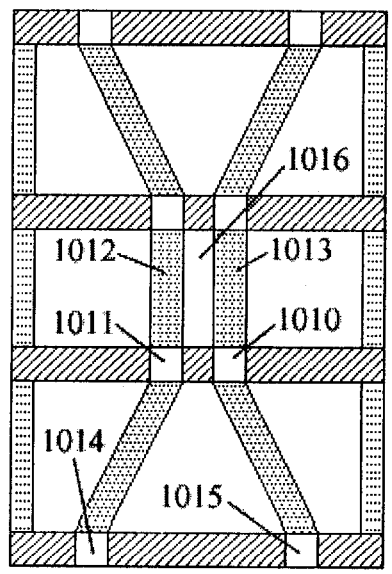

FIG. 10(c) is an embodiment of an optical switch. It is formed the same way as the Mack-Zehnder interferometer. But integrated devices lie around windows 1010 and 1011 that, if on, change the refractive index of the wave-guides 1012 or 1013 or a redeposit lower refractive index resist or other material 1016 around the wave-guides 1012 and 1013. If light enters wave-guide 1012 and its refractive index changes, light can switch from wave-guide 1012 to 1013 and visa versa.

Figure 10D:
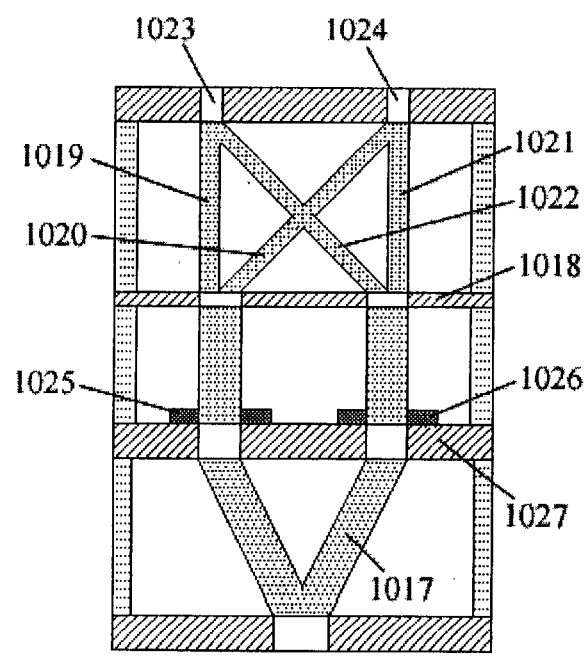

FIG. 10(d) is an embodiment of another optical switch in which the wave-guides 1017 split and pass through a computer generated thin film hologram 1018. Light passing through the computer generated thin film hologram 1018 possesses the property to change the phase of light as it passes through it. The light passing through the wave-guides 1017 originates from a common source so that the light is coherent. If the hologram changes the phase of one of the paths the light will interfere with itself, as it does in the Mack-Zehnder device. Dependent on hologram 1018, it is possible to change the phase of the light along one of the paths. Therefore, when the light splits a second time along wave-guides 1019, 1020 and 1021, 1022 it can interfere with itself, creating destructive or constructive interference along certain paths leading to windows or detection devices 1023 and 1024. By using both a fixed hologram 1018 and varying spatial light modulators 1025 and 1026 located on substrate 1027, a programmable interconnect can be formed.

Figure 10E:
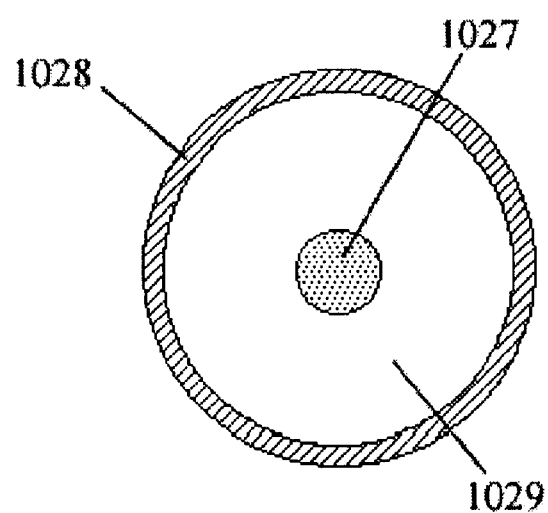
Figure 10F:
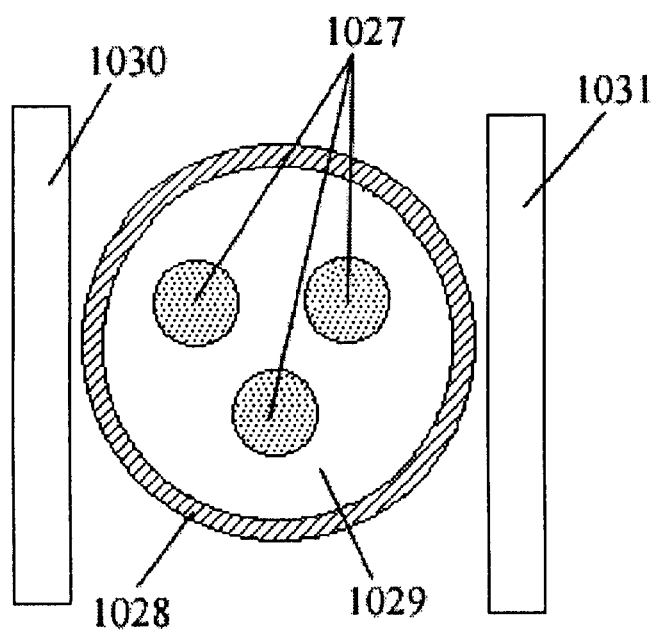

In another embodiment of this invention exposed resist wave-guide rings 1027 can be created around wave-guides 1028 to trap unexposed resist 1029 forming a cladding around a linear wave-guide as shown in FIG. 10(e). The wave-guide ring 1028 can also encircle more than one linear wave-guide as shown in FIG. 10(f). Light signals from the linear wave-guides can pass to the ring wave-guide or visa-versa crating multi line switches, controlled by refractive index modulating devices 1030 and 1031 located on either side of the ring wave-guides.

The devices in FIGS. 10(b) through 10(d) could be formed using layers of resist with decrease sensitivity to exposure. The bottom layer of the formation is the least sensitive and the top layer is the most sensitive. This is to allow the creation of intricate paths without exposing already formed lower layers. To optimize the system, the path of the light through the layers of resist will be from the resist with the lowest index of refraction to the resist layer with the greatest index of refraction. The above optical devices take up less space and are less expensive to form than prior art using traditional wave-guides or free waves.

Formation of surface or buried dopant level imaging and detection device

Figure 11:
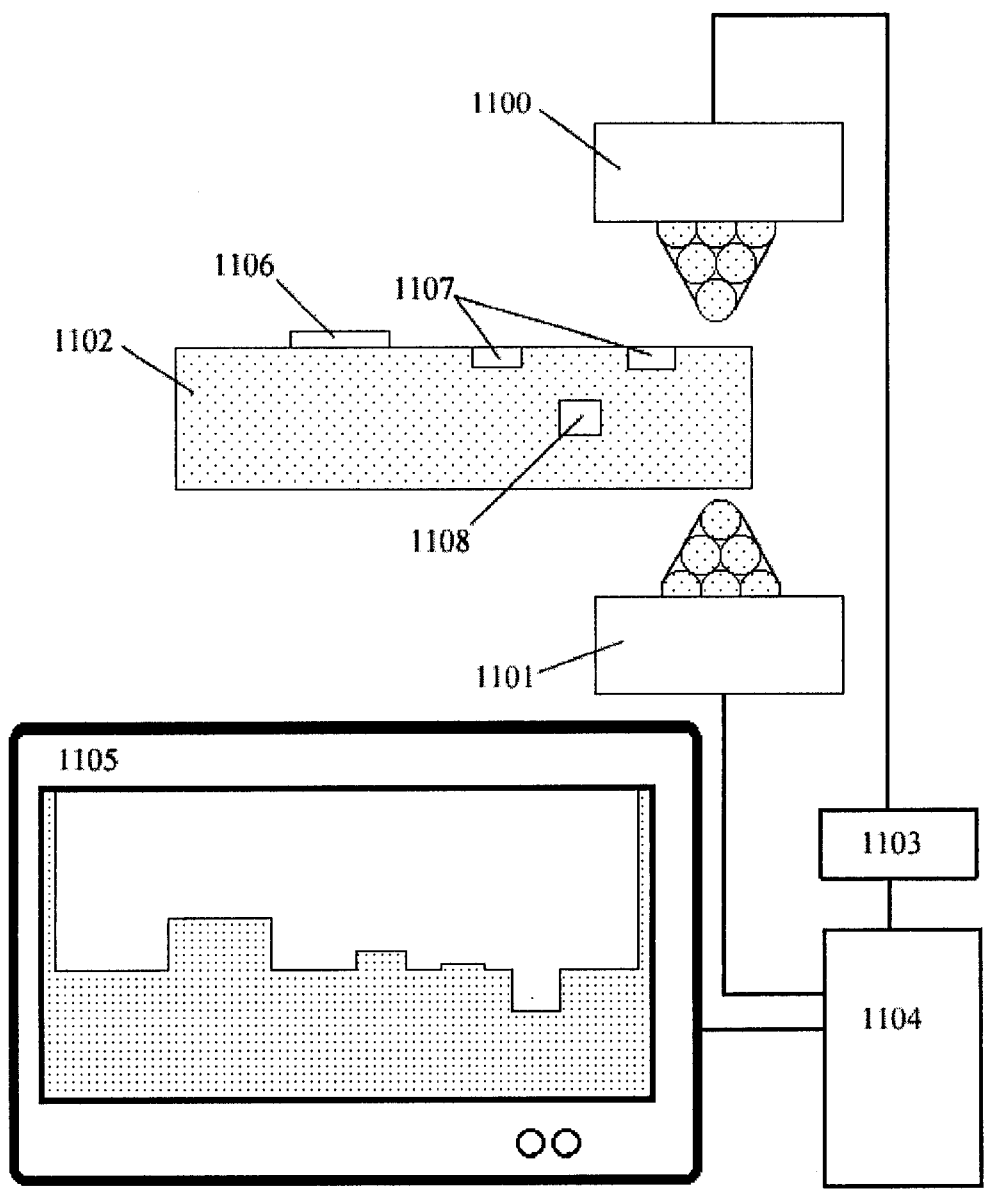
FIG. 11 is an embodiment of the invention in which the electric field and induced surface charges between the probes are used to create images of a substrate's surface and of dopants under the surface of a substrate.

FIG. 11 is an embodiment of this invention in which probes 1100 and 1101 are placed on either side of a substrate 1102 to form a scanning tunneling microscope. The tip 1100 is connected to a tunneling current amplifier 1103 connected to computer 1104 and to a visual display 1105. If the substrate 1102 consists of one material, the image produced will be the representation of the surface of substrate 1102. If probe 1100 was a cantilever probe and an AC current applied to probe 1101, the invention could also be used as an electrostatic force microscope. The main difference to prior art being, unlike a traditional electrostatic force microscope, there are no electrical contacts made on the substrate and substrate 1102 can be a semiconductor or an insulator. The electron tunneling current created between probes 1100 and 1101 travels through the entire substrate 1102. Any buried dopants 1108, surface dopants 107, or other materials 106 will change the dielectric strength of substrate 1102 and therefore its induced surface charge. The size of the dopant pocket 1108 using this technique can also be calculated. The area where the dopant 1108 lies will create a valley or a peak on the display dependent on the dopants dielectric properties. Using this technique the capacitance of the dopant can be found if the tunneling current between probes 1100 and 1101 and the dielectric strength of the dopant and substrate are known.

What is claimed is:

1. In a process in which materials are formed into ions or dipoles and are manipulated onto or off of a substrate through a medium to form micro or nano devices, patterns, formations and machines, the improvement comprising:

providing a substrate having first and second opposed surfaces;

providing first and second probes:

aligning said probes on either side of said substrate so that said probes are in substantial alignment with each other adjacent said first and second surfaces, respectively;

applying electrical voltage to said probes to create an electric field therebetween, and controlling the intensity, modulation, duration and polarity of the electric field between said probes.

2. The method according to claim 1 further comprising the use of very sharp probes in which the probe tips are at least an atom across.

3. The method according to claim 1 wherein at least one of said probes is in the medium.

4. The method according to claim 1 wherein neither of said probes is in the medium.

5. The method according to claim 1 further comprising forming at least one contact on said substrate.

6. The method according to claim 1 further comprising creating induced surface charges by the use of said probes.

7. The method according to claim 6 further comprising the step of manipulating the material on the surface of said substrate using an electric force or field and the induced surface charge created between said probes.

8. The method according to claim 1 further comprising the step of moving said substrate and probes relative to each other to manipulate said material along a designated path.

9. The method according to claim 1 wherein at least one of said probes is covered with said material.

10. The method according to claim 9 in which the material covering the probe is removed by said electric field and deposited onto said substrate.

11. The method according to claim 1 further comprising repeating said steps to create multiple layer devices, patterns, formations, and machines.

12. The method according to claim 1 further comprising the step of increasing the electric voltage to create a tunneling current or electron beam between said probes to thereby lift or vaporize material or substrate into a medium or vacuum creating desired devices, patterns, formations, machines, pits, or holes.

13. The method according to claim 1 further comprising heating said substrate and medium to a temperature around the natural diffusion temperature of the deposited dopant material to help the pulling of dopant material into the substrate or medium.

14. The method according to claim 13 in which the dopant material is pulled through said substrate or medium to another point on its surface creating a dopant tunnel.

15. The method according to claim 14 further comprising patterning material over a selected tunnel formation and diffusing the patterned material through the existing tunnel to form a second tunnel with a smaller radius within the first tunnel.

16. The method according to claims 15 further comprising shaving said substrate to a depth in which the tunneled dopant appears on the said surface.

17. The method according to claim 13 further comprising the pulling of a pre-patterned material, located in between two substrates, through the substrates forming tunnels, branches, and dopant webs.

18. The method according to claim 17 further comprising the formation of and connection of integrated devices on the surface of said substrate using the formed dopant tunnels as interconnects.

19. The method according to claim 1 including the step of first positioning a resist on said substrate.

20. The method according to claim 19 further including the step of altering the resist using said electric field.

21. The method according to claim 1 wherein said substrate is comprised of a semiconductive material so as to form light emitting diodes, sensor devices or photo cells.

22. The method according to claim 1 further comprising the steps of coating said substrate with a resist comprised of an e-beam sensitive material; increasing the electric voltage to create a tunneling current or electron beam between said probes and scanning said tunneling current or electron beam over said coated substrate to thereby expose the resist to create a mask on top of said substrate.

23. A method of creating an optical wave-guide comprising:

providing a first substrate having a first optical device thereon;

providing a second substrate having a second optical device thereon;

placing said first substrate over said second substrate with an electron sensitive resist therebetween;

providing first and second probes;

aligning said probes on either side of said combined first and second substrates with said first probe being in alignment with said first optical device and said second probe being in alignment with said second optical device, and applying electrical voltage to said probes to expose said resist to thereby form a wave-guide between said first and second optical devices.

24. The method as claimed in claim 23 further including the step of providing an additional substrate including means thereon for manipulating light and interposing said additional substrate between said first and second substrates before applying said electrical voltage.

25. The method according to claim 23 further comprising the step of placing at least one light producing device within the said resist and turning the device on or off to amplify or pulse signals through said wave-guide.

26. A scanning tunneling microscope including first and second spaced apart probes and means for supporting an object to be examined therebetween; means for applying electrical voltage to said probes to create an electric field therebetween; means for detecting changes in voltage at least one of said probes caused by induced surface charges on said object; means for analyzing said changes and means for displaying the results of said analyzing means.

* * * * *